(12) United States Patent
Inui

(10) Patent No.: US 6,846,146 B2
(45) Date of Patent: Jan. 25, 2005

(54) LOAD STORAGE EQUIPMENT

(75) Inventor: Yoshitaka Inui, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 67 days.

(21) Appl. No.: 10/235,036

(22) Filed: Sep. 3, 2002

(65) Prior Publication Data

US 2003/0059285 A1 Mar. 27, 2003

(30) Foreign Application Priority Data

Aug. 31, 2001 (JP) ........................................ 2001-262858

(51) Int. Cl.⁷ ............................................... B65G 1/00
(52) U.S. Cl. ........................... 414/331.05; 414/331.05; 414/331.07; 414/331.11; 414/331.18
(58) Field of Search ..................... 414/331.02, 331.05, 414/331.07, 331.11, 331.18, 940

(56) References Cited

U.S. PATENT DOCUMENTS

| | | | | |
|---|---|---|---|---|
| 4,439,146 A | * | 3/1984 | Sugita | .......................... 432/253 |
| 5,387,265 A | * | 2/1995 | Kakizaki et al. | ........... 29/25.01 |
| 5,607,275 A | * | 3/1997 | Woodruff et al. | ...... 414/331.05 |
| 5,795,356 A | * | 8/1998 | Leveen | ....................... 29/25.01 |
| 6,134,482 A | * | 10/2000 | Iwasaki | ....................... 700/121 |
| 6,332,744 B1 | * | 12/2001 | Fukushima et al. | ......... 414/283 |
| 6,385,503 B2 | * | 5/2002 | Volle | ........................... 700/218 |
| 6,481,945 B1 | * | 11/2002 | Hasper et al. | .............. 414/217 |
| 6,663,332 B1 | * | 12/2003 | Sluijk et al. | ................ 414/160 |

FOREIGN PATENT DOCUMENTS

JP            10-098094           4/1998

\* cited by examiner

Primary Examiner—Joe Dillon, Jr.
(74) Attorney, Agent, or Firm—Goodwin Procter LLP

(57) ABSTRACT

Load storage equipment according to the present invention includes rotary racks 21, each of which is supported independently on a story 1 or 2, and which may not extend vertically through the slab 4 between the stories 1 and 2. The storage equipment also includes a transferrer 51 common to the rotary racks 21. Each of the rotary racks 21 can turn on a vertical axis 22 and includes load supports 32 arranged circumferentially around the vertical axis 22 and vertically. The transferrer 51 extends vertically near the sides of the rotary racks 21 and through the slab 4. The transferrer 51 includes a carrier 81, which can vertically move to carry loads to and from the load supports 32.

15 Claims, 17 Drawing Sheets

FIG.17
(a)
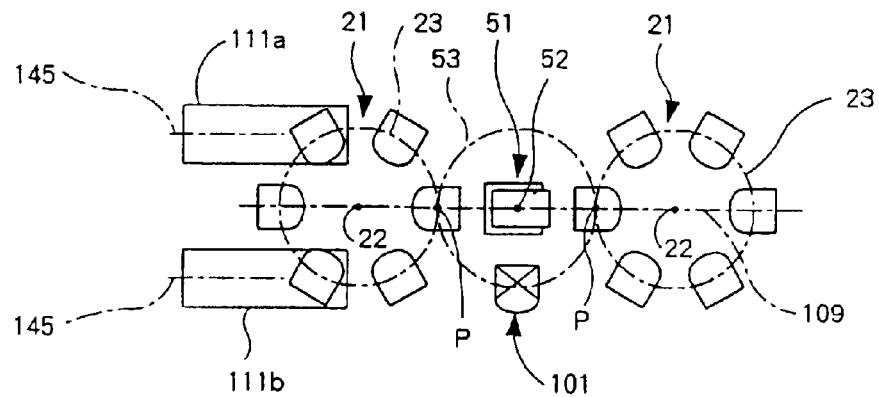
(b)
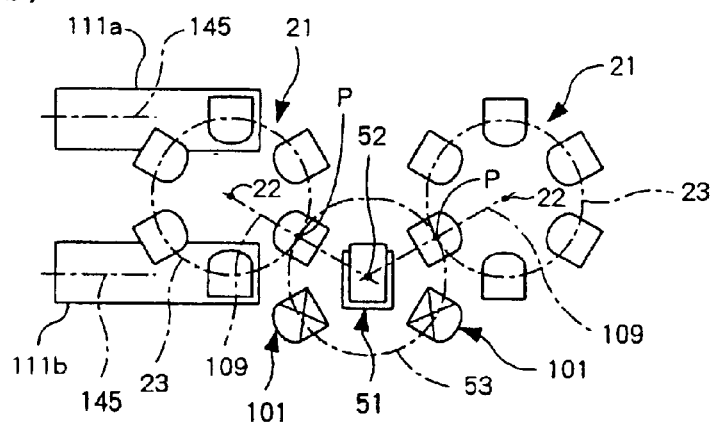
(c)
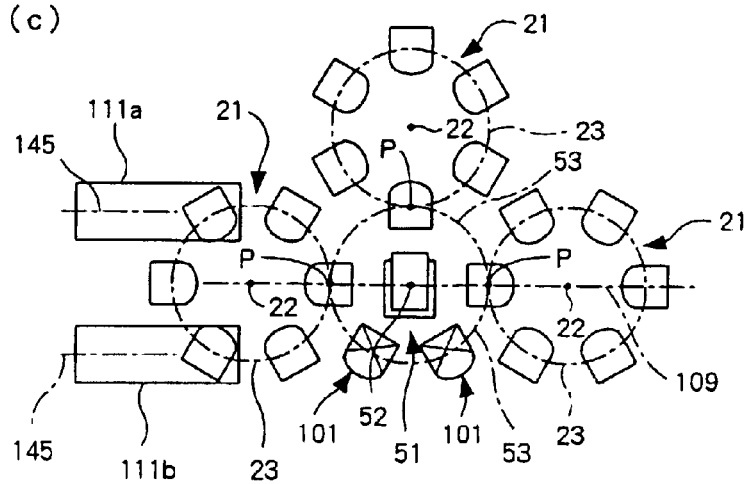

FIG. 18
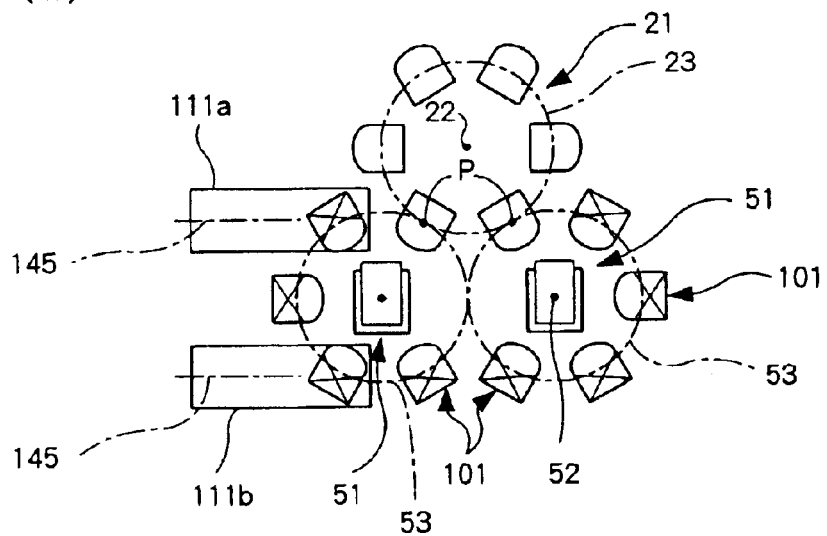
(a)
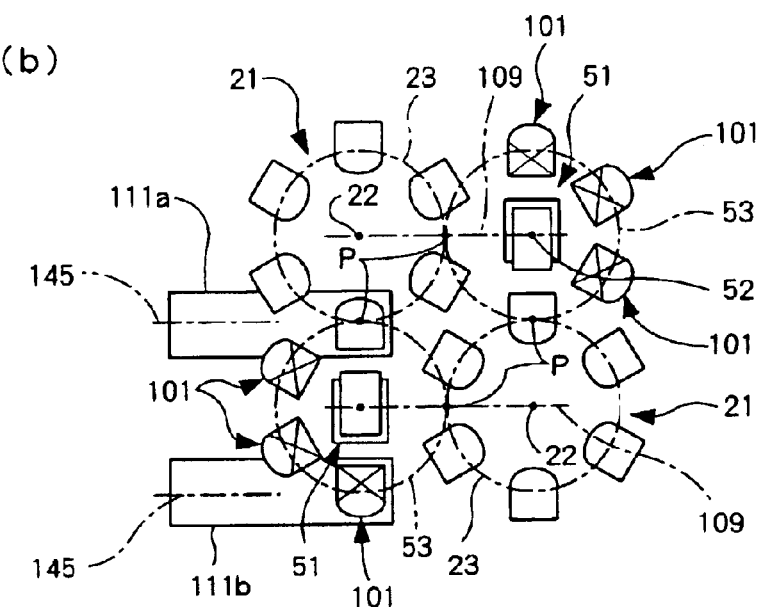
(b)

LOAD STORAGE EQUIPMENT

FIELD OF THE INVENTION

The present invention relates to load storage equipment for storing loads on two or more stories.

PRIOR ART

As an example, Japanese Patent Laid-Open Publication No. H10-98,094 discloses a conventional load storage equipment installed in clean rooms. The storage equipment includes a rectangular or square housing and a cylindrical rack, which is fitted in the housing. There is a grating floor between an upper clean room and a lower clean room. The grating floor has an opening, through which the housing extends.

The cylindrical rack includes a cylindrical frame standing in the housing. The frame supports a number of vertically arranged stages of circumferentially arranged shelves or load supports. The rack has a port, through which loads can be moved into it and out of it. A transferrer is fitted in the center of the rack and includes a turntable, a guide post, a lift and a load holder. The turntable can be turned on a vertical axis. The post stands on the turntable and supports the lift in such a manner that the lift can move vertically along the post. The lift supports an arm, which supports the holder.

A load can be transferred between the port and any one of the shelves by the combination of the turning action of the turntable, the vertical movement of the lift, the bending action and stretching action of the arm, the holding action and releasing action of the load holder, etc. Because the cylindrical rack extends in the upper and lower clean rooms, loads can be stored on the two stories.

The placement of the transferrer in the center of the cylindrical rack requires that the rack be large in diameter. Because the housing, which houses the large rack, extends through the opening in the grating floor, the opening needs to be large. In order to increase the number of shelves at each stage to store more loads, there is a need to enlarge the rack diameter and the opening. This not only increases the cost of construction but also decreases the strength of the floor, making it difficult to put the storage equipment to practical use.

SUMMARY OF THE INVENTION

The object of the present invention is to provide compact load storage equipment that is easy to construct, and that can store loads on two or more stories.

Load storage equipment according to the present invention includes at least two rotary racks each supported independently on a story rotatable on a first vertical axis. Each of the rotary racks includes a number of load supports arranged circumferentially around the vertical axis and arranged vertically. The storage equipment also includes a common transferrer extending vertically near the sides of the rotary racks and through the floor between the stories on which the racks are supported. The transferrer includes a carrier vertically movable so as to carry loads to and from the load supports.

A load can be transferred between the carrier of the transferrer and any one of the load supports of the rotary racks, with the associated rack turned on its vertical axis to shift the load support to a transfer position adjacent to the transferrer, and with the carrier moved vertically to an operating position adjacent to the transfer position. In the case of the load support being loaded by the foregoing process, the load may be supplied manually or mechanically to the carrier prior to the process. In the case of the load support being unloaded by the foregoing process, the load may be carried manually or mechanically from the carrier.

The load supports of each rotary rack can turn around its vertical axis. Because each rotary rack can be fitted without a transferrer in it, the turning radius of its load supports can be a minimum that allows the necessary number of load supports to be arranged circumferentially around the axis. This enables the rotary rack to be smaller in diameter and more compact than the conventional rack fitted with a transferrer in it. In the storage equipment according to the present invention, only the transferrer, not the rotary racks, extends vertically through the floor between the stories and the opening in the floor can be very small. The small opening does not seriously decrease the floor strength. It is accordingly easy to install the storage equipment in an existing building.

In comparison with a case where a rotary rack and a transferrer are fitted on each story, the storage equipment uses only one vertically movable carrier and only one driver for the transferrer. This makes it possible to greatly reduce the cost of equipment. The carrier can move vertically between the rotary racks and operate even at positions close to the ceiling and floor of each story. Accordingly, the bottom stage of load supports of the upper rotary rack can be positioned close to the floor of the upper story. Likewise, the top stage of load supports of the lower rotary rack can be positioned close to the ceiling of the lower story. This enables the storage equipment to store more loads.

The first vertical axes of the rotary racks may be coaxial with each other. The coaxial axes make it possible to orient the carrier in a fixed direction if the transferrer transfers loads only between it and each of the rotary racks. This makes it easier to produce the storage equipment than a case where a transferrer must change direction for rotary racks that are not coaxial with each other on different stories.

A fixed rack may be fitted on at least one of the stories. The fixed rack and the adjacent rotary rack may be arranged around the transferrer. The carrier may be supported rotatably on a second vertical axis so as to turn between positions each adjacent to one of the fixed rack and the adjacent rotary rack.

The fixed rack can be positioned in a space on one side of the transferrer, which is narrower than the rotary racks. This improves the floor use efficiency of the whole equipment, enabling the equipment to store more loads. The additional fixed rack can be loaded and unloaded by the transferrer for loading and unloading the rotary racks. This makes it possible to greatly reduce the cost of equipment in comparison with a case where a fixed rack requires an exclusive transferrer.

The rotary rack on each story may include at least two rotary racks supported around the transferrer. If the carrier is supported rotatably on the second vertical axis, it can turn between positions each adjacent to one of the rotary racks on each story.

The two or more rotary racks on each story can store much more loads than the single rotary rack. The single transferrer can load and unload the rotary racks on each story. This makes it possible to greatly reduce the cost of equipment in comparison with a case where a transferrer is provided for each rotary rack on the same story.

An inlet-outlet port may be formed on at least one of the stories. The inlet-outlet port and the adjacent rotary rack may be arranged around the transferrer. If the carrier is supported rotatably on the second vertical axis, it can turn between positions each adjacent to one of the inlet-outlet port and the adjacent rotary rack.

Loads can be transferred mechanically between the carrier and each of the inlet-outlet port and the rotary racks. This removes the need to manually take from the carrier a load transferred by the transferrer from each of the rotary racks, and to manually supply the carrier with a load for loading into each of the racks. It is consequently easy to carry loads into and out of the storage equipment automatically in combination or cooperation with a peripheral conveying line.

The transferrer may further include a post, a lift and a turner. The lift is supported vertically movably along the post. The turner is supported on one side of the post by the lift rotatably on the second vertical axis. The carrier is supported on the turner horizontally movably in opposite directions between a retracted position on or over the turner and a protruded position. If the carrier is supported rotatably on the second vertical axis, it moves vertically through the opening in the floor between the stories when it is in the retracted position, with the opposite directions parallel to the plane on which the post and the second vertical axis extend.

If the opening in the floor may be large, the whole transferrer, inclusive of the post, could turn on the second vertical axis, and the carrier could, regardless of the direction in which it faces, move vertically through the floor opening. In consideration of the influence on the floor strength, the cost of forming the floor opening, etc., it is preferable that the opening be as small as possible. The foregoing structure minimizes the area in plan view of the carrier, inclusive of the post, at the time when the carrier moves through the floor opening. This enables the floor opening to be small, making it easy to put the storage equipment practical use.

A clean room may be formed on at least one of the stories. It is preferable that a housing be formed in the clean room and house in isolation the associated rotary rack and part of the transferrer. This keeps the purified atmosphere in the clean room from being contaminated with dust scattered by the operation of the rotary rack and the transferrer.

Other structural features and/or characteristics of the present invention will be understood easily from the following description of preferred embodiments of the invention with reference to the accompanying drawings.

BRIEF DESCRIPTION OF THE DRAWINGS

FIG. 17($a$) is a schematic top plan of load storage equipment according to a second embodiment of the present invention.

FIG. 17($b$) is a schematic top plan of load storage equipment according to a third embodiment of the present invention.

FIG. 17($c$) is a schematic top plan of load storage equipment according to a fourth embodiment of the present invention.

FIG. 18($a$) is a schematic top plan of load storage equipment according to a fifth embodiment of the present invention.

FIG. 18($b$) is a schematic top plan of load storage equipment according to a sixth embodiment of the present invention.

EXEMPLARY EMBODIMENTS

Figure 1:
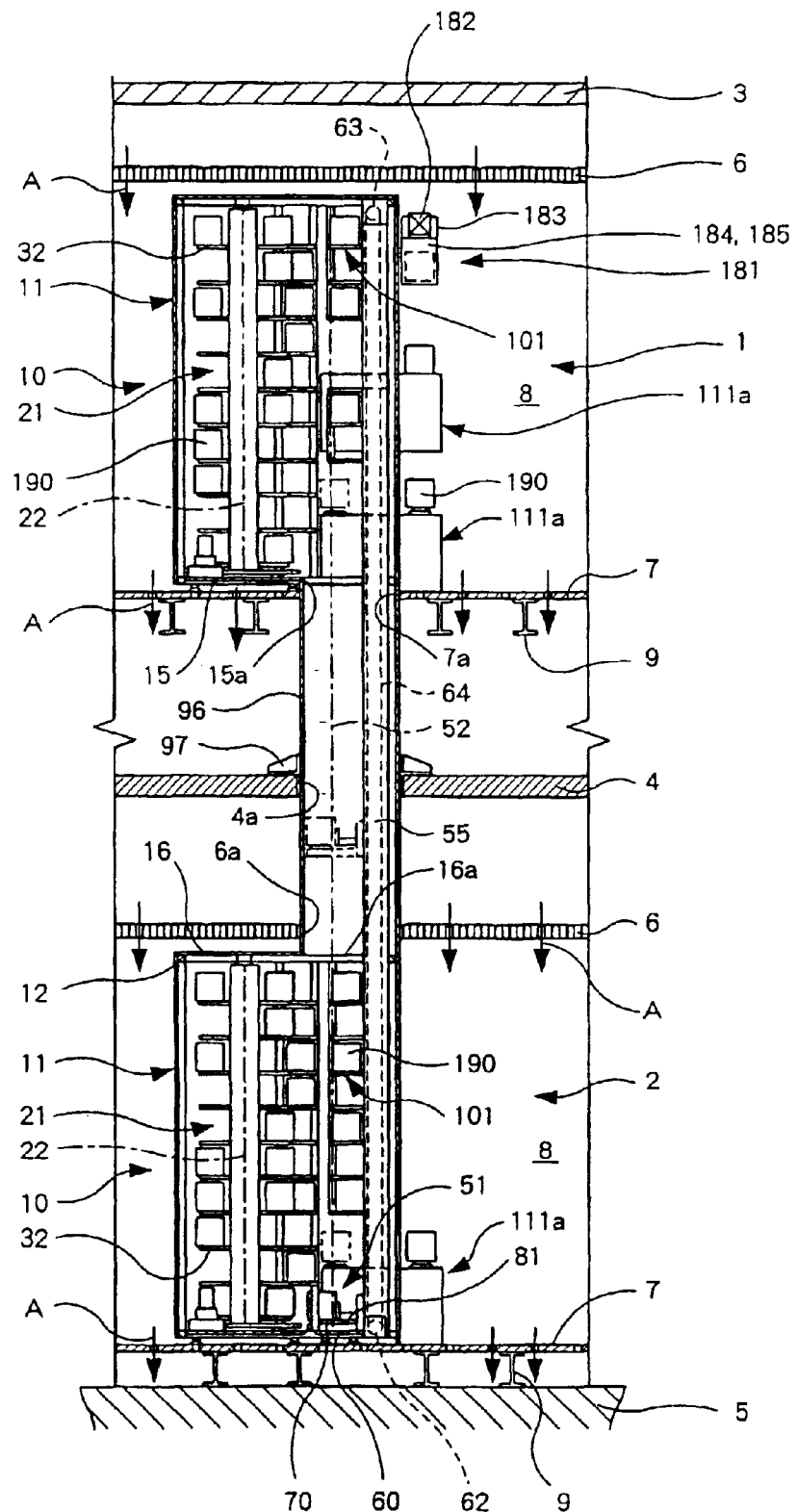
FIG. 1 is a side view in vertical section of load storage equipment according to a first embodiment of the present invention.

The following sections describe exemplary embodiments of the present invention. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not," "must," and "must not," are not meant to limit the scope of the present invention as the embodiments disclosed herein are merely exemplary.

FIGS. 1–16 show load storage equipment according a first embodiment of the present invention.

As shown in FIGS. 1–4, in an exemplary embodiment, an upper story 1 is defined between a ceiling slab 3 and an intermediate floor slab 4, and a lower story 2 is defined between the floor slab 4 and a base floor slab 5. On each of the stories 1 and 2, a clean room 8 is defined between a top filter plate 6 for air supply and a bottom grating or porous plate 7 for air release, which is supported by beams 9. The clean room 8 is kept clean on a downflow system, where clean air A is supplied through the filter plate 6 into the room 8, flows downward through the room 8 and is released from the room 8 through the grating plate 7.

Each of the upper and lower clean rooms 8 houses a load storage apparatus 10. The upper and lower storage apparatuses 10 may be nearly identical in structure and each include a housing 11 in the form of a rectangular box, a rotary rack 21, four fixed racks 101, an inlet port 111$a$ and an outlet port 111$b$. The housing 11 houses the rotary and fixed racks 21 and 101. The ports 111$a$ and 111$b$ extend through a wall of the housing 11. A transferrer 51 is common to the two storage apparatuses 10.

Figure 2:
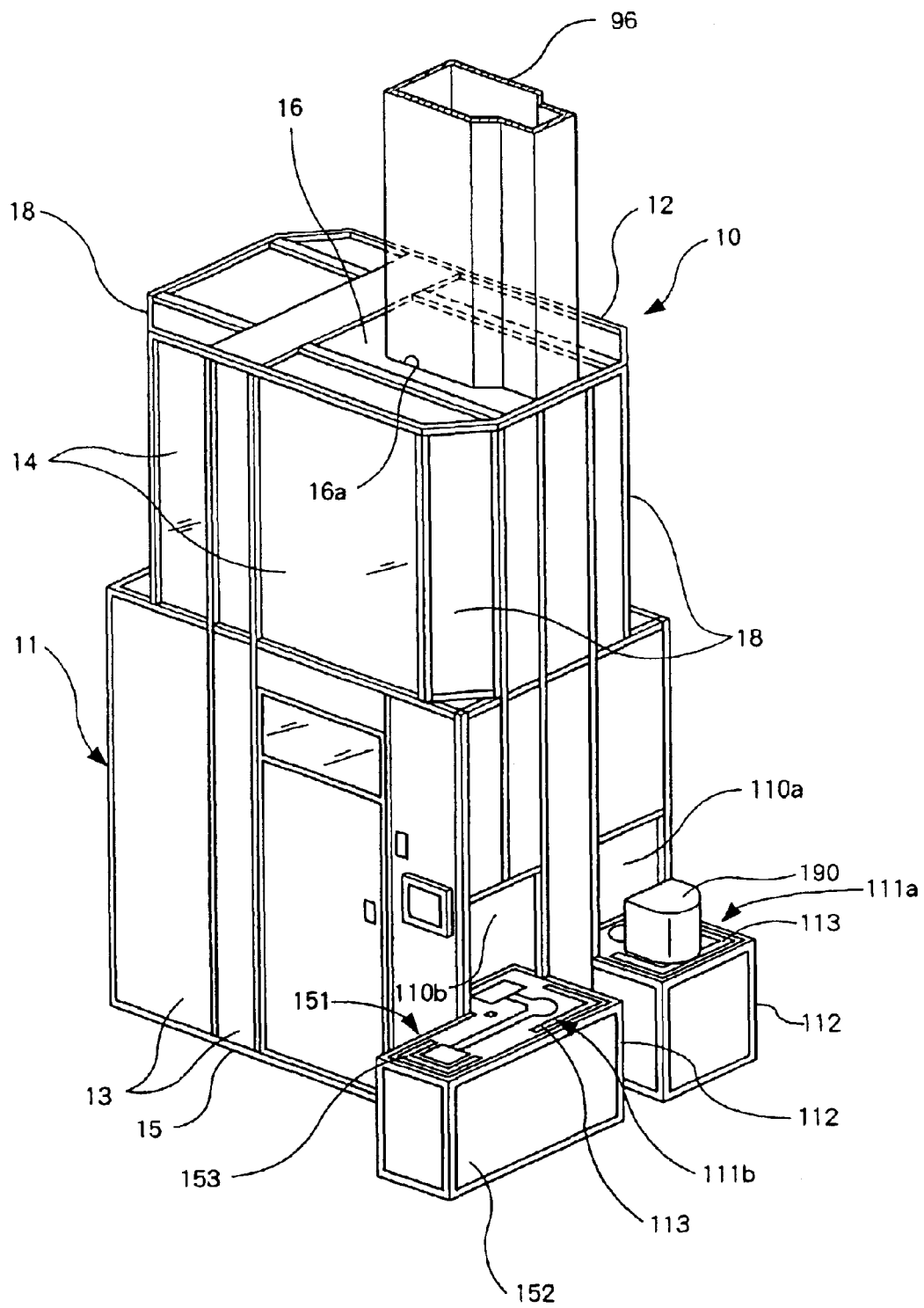
FIG. 2 is a perspective view of a lower load storage apparatus of the storage equipment.

The housing 11 defines a closed or sealed storage chamber 17 in it and includes a framework 12, a lower wall 13, an upper wall 14, a base plate 15 and a top plate 16. The walls 13 and 14 surround the lower and upper halves respectively of the framework 12. The plates 15 and 16 are fixed to the bottom and top respectively of the framework 12. As shown in FIG. 2, at least one of the walls 13 and 14, for example, the upper wall 14, may be formed with a window, which may be a resinous transparent plate. The inside of the storage chamber 17 can be observed through the window.

Figure 3:
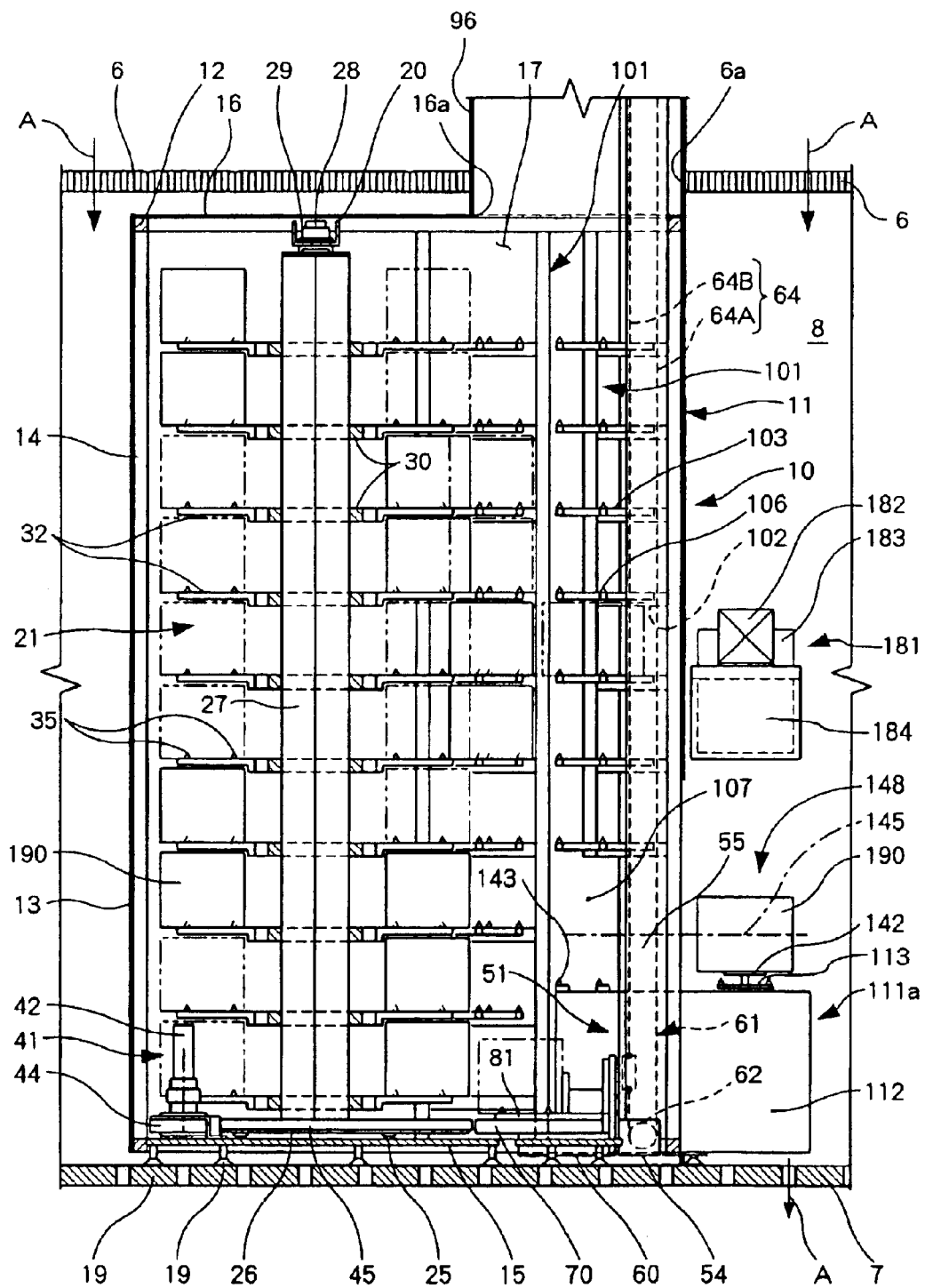
FIG. 3 is a side view in vertical section of the lower storage apparatus.

As shown in FIG. 2, a length of one or more of the vertical corners of the housing 11 may be cut obliquely. For example, the four vertical corners 18 of the part of the housing 11 that is surrounded by the upper wall 14 are cut obliquely in plan view. As shown in FIG. 3, the base plate 15 of the housing 11 is supported by legs 19 standing on the grating plate 7.

As shown in FIGS. 3–6, the rotary rack 21 and the adjacent portion of the transferrer 51 may be positioned in a front portion and a rear portion respectively of the storage chamber 17. The fixed racks 101 are positioned around the transferrer 51. The rotary rack 21 is supported rotatably on a vertical axis 22. The rotary rack 21 has a cylindrical path 23 coaxial with the vertical axis 22. The rotary rack 21 includes vertically arranged stages of turning shelves 32, which are arranged circumferentially at regular intervals on the cylindrical path 23.

In the present embodiment, the base plate 15 supports a turntable 26 with a circular guide rail 25 interposed between them. The guide rail 25 and the turntable 26 are coaxial with the vertical axis 22. The turntable 26 supports a hexagonal hollow column 27 standing on it, which is closed at its top with a closing plate 27A. A vertical pin 28 stands on the center of the closing plate 27A. The housing 11 is fitted with a supporting member 20 at its top, which supports the vertical pin 28 with a bearing 29 interposed between them. This makes the hexagonal column 27 rotatable on the vertical axis 22.

In an exemplary embodiment, the hexagonal column 27 is fitted with a number of hexagonal plates 30 around it at vertical intervals. Each of the hexagonal plates 30 is fixed to the hexagonal column 27 by means of fixtures 31. Each of the hexagonal plates 30 supports six of the turning shelves 32 each at one of its six peripheral sides. One end of each turning shelf 32 is fixed to the associated hexagonal plate 30 with connectors 33 in such a manner that the shelves 32 protrude in the form of cantilevers around the hexagonal column 27 radially from the vertical axis 22.

In the present embodiment, each of the turning shelves 32 is a horizontal plate with a recess 34, which is open outward radially of the vertical axis 22. Each turning shelf 32 is fitted with positioning pins 35 on its upper side around the associated recess 34. Here, three positioning pins are used. Each turning shelf 32 is also fitted with reflecting plates 36 as part of a load detector on its fixed end. Each turning shelf 32 is further fitted with a reflector 37 as part of a level detector on one of its free ends. However, other detectors known in the art may be used.

The rotary rack 21 can be turned by a rack driver 41, which consists of a rotational drive 42, a driving gear 44 and a ring gear 45. The rotational drive 42 is mounted on a corner of the base plate 15 of the housing 11 and includes a driving shaft 43 extending downward from it. The driving shaft 43 is fitted with a driving gear 44. The turntable 26 is fitted with a ring gear 45 around it, which is in mesh with the driving gear 44. The rotational drive 42 includes a motor and a speed reducer and can turn the driving shaft 43 in both directions.

The turning of the driving shaft 43 in both directions by means of the rotational drive 42 turns the rotary rack 21 in both directions on the vertical axis 22 through the gears 44 and 45. The rotary rack 21 can be controlled to turn within an angular range of 180 degrees. The parts and/or components 24–45 compose the rotary rack 21, which may consist of other parts and/or components. The vertical axes 22 of the upper and lower rotary racks 21 may be coaxial with each other.

As shown in FIGS. 1, 3, 4 and 7–9, the common transferrer 51 extends through the intermediate floor slab 4 between the stories. The transferrer 51 includes a carrier 81, which is supported in such a manner that it can turn about a vertical axis 52 and move vertically.

In an exemplary embodiment, the transferrer 51 includes a base frame 54, which rests on the base plate 15 of the housing 11 on the lower story 2. A post 55 stands on the base frame 54 and is fitted with a pair of vertical guide rails 56 on its front side. The top plate 16 of the housing 11 and the top filter plate 6 on the lower story 2 have an opening 16a and an opening 6a respectively formed through them. The intermediate floor slab 4 has an opening 4a formed through it. The grating plate 7 and the base plate 15 of the housing 11 on the upper story 1 have an opening 7a and an opening 15a respectively formed through them. The post 55 extends upward through the openings 16a, 6a, 4a, 7a and 15a to a level near the top plate 16 of the upper housing 11.

Figure 8:
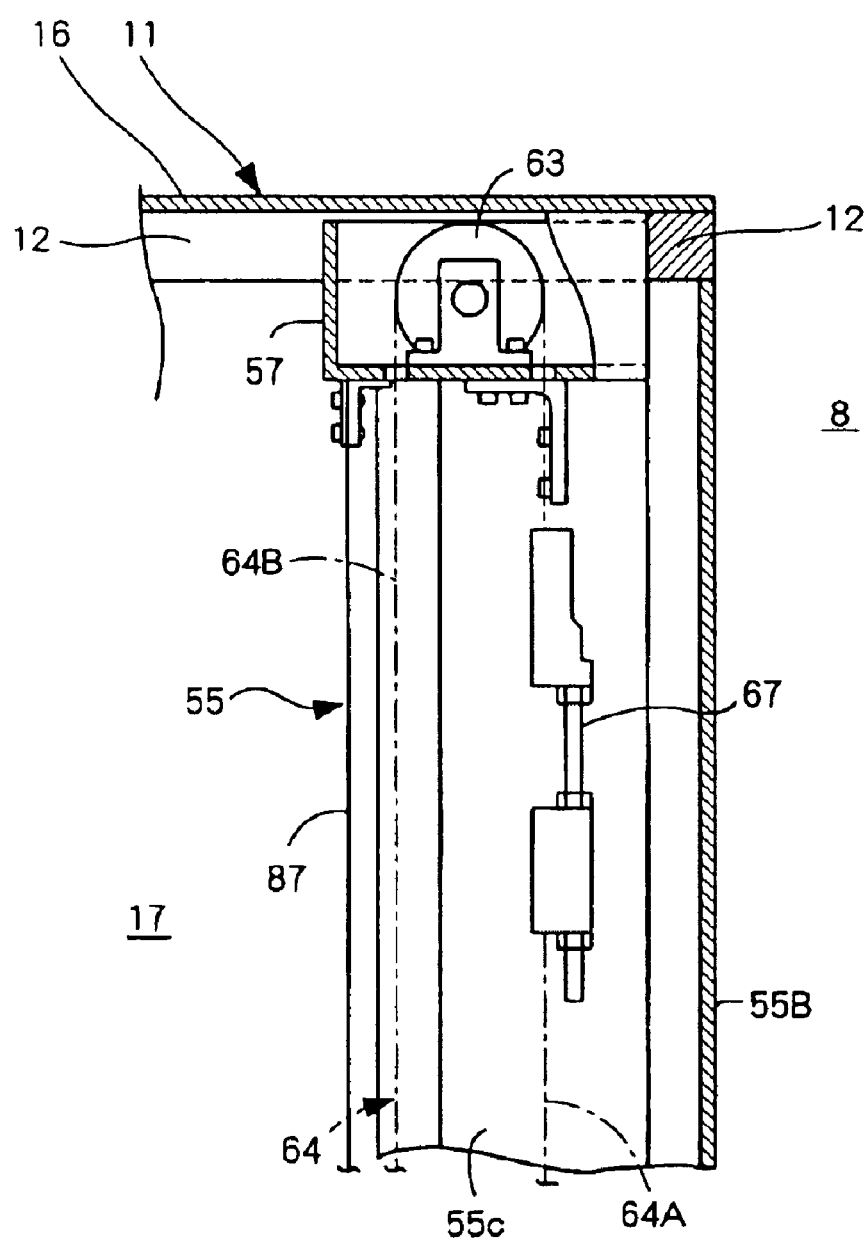
FIG. 8 is a side view partially in section of an upper portion of the transferrer.
Figure 9:
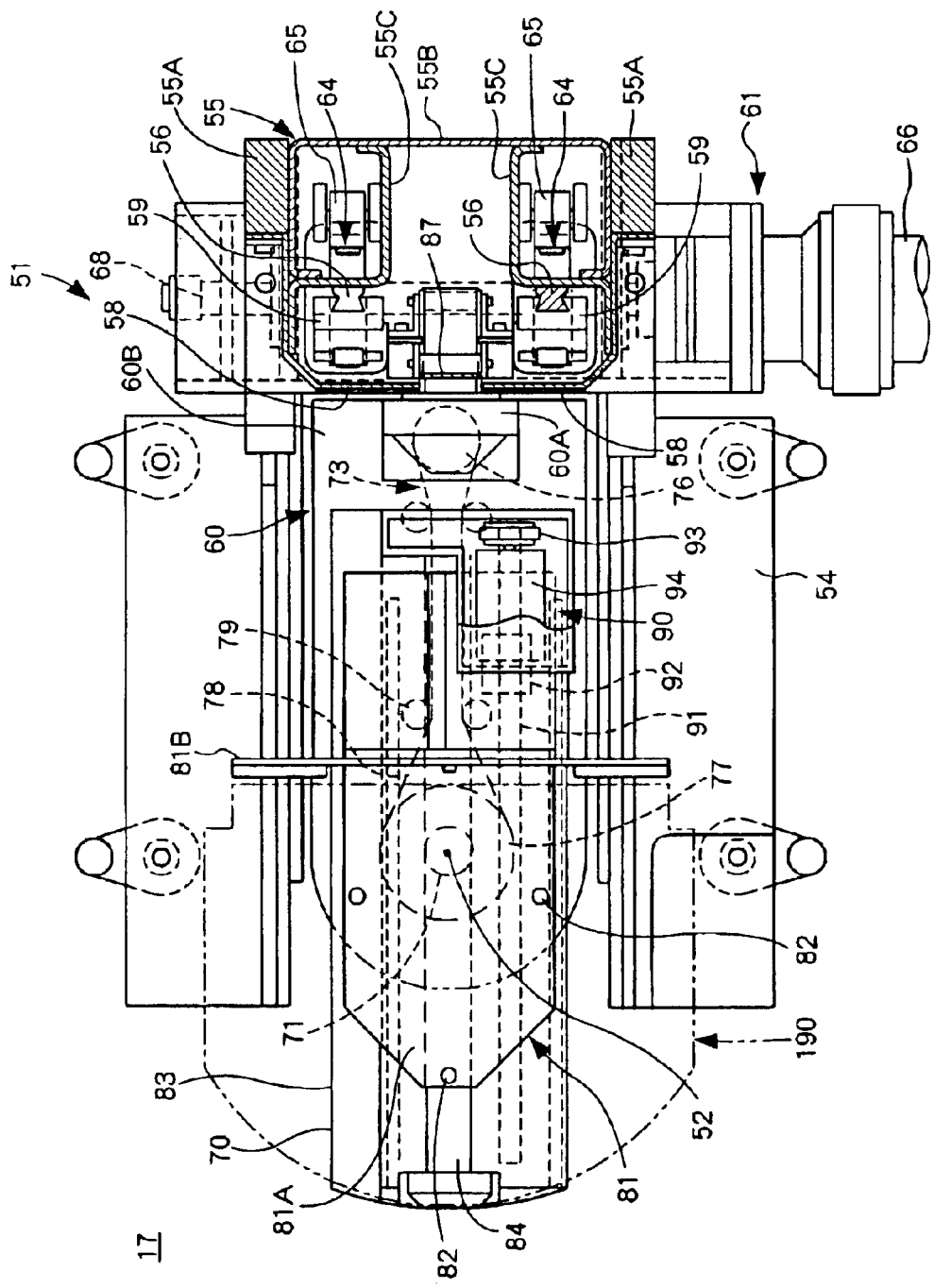
FIG. 9 is a top plan partially in section of the transferrer.

As shown in FIG. 9, the post 55 consists of a pair of side members 55A, a rear member 55B connecting them, and a pair of front members 55C positioned on the front side of the rear member 55B. Each of the guide rails 56 extends on the front side of one of the front members 55C. Each of the front members 55C is fitted with a cover 58, which covers the associated rail 56. As shown in FIG. 8, the top of the post 55 is connected a top frame 57, which is fixed to the top of the framework 12 of the housing 11 on the upper story 1.

In an exemplary embodiment, the transferrer 51 includes a lift 60 with a pair of vertical sliders 59 each in slidable engagement with one of the vertical guide rails 56. The lift 60 can be moved vertically by a vertical driver 61. The lift 60 is L-shaped in side view, including a vertical member 60A and a horizontal member 60B. The vertical sliders 59 are fixed to the vertical member 60A, the lower end of which is fixed to the rear end of the horizontal member 60B. The vertical sliders 59 are connected to the vertical member 60A by a narrow part, which can move vertically between the covers 58.

The vertical driver 61 includes a pair of driving pulleys 62, a pair of driven pulleys 63, a pair of timing belts (or chains, wire ropes or the like) 64, a pair of guide pulleys 65 and a rotational drive 66. Each pair of pulleys 62, 63 and 65 includes right and left pulleys. The rotational drive 66 is coupled to the driving pulleys 62, which are supported within the base frame 54 at the bottom of the post 55. The driven pulleys 63 are supported within the top frame 57 at the top of the post 55. Each of the timing belts 64 connects one of the driving pulleys 62 and one of the driven pulleys 63. The guide pulleys 65 are supported near the driving pulleys 62 and each guide one of the timing belts 64.

Each of the timing belts 64 consists of a lower part 64A and an upper part 64B, which are in engagement with the associated driving and driven pulleys 62 and 63 respectively. Each of the timing belts 64 is connected to one of the vertical sliders 59, each of which is interposed between one end of the associated lower belt part 64A and one end of the associated upper belt part 64B. A tension adjuster 67 is interposed between the other ends of the parts 64A and 64B of each timing belt 64. The rotational drive 66 includes a reversible motor and a speed reducer. The rotational drive 66 also includes a driving shaft 68, to which the driving pulleys 62 are fixed.

The horizontal member 60B of the lift 60 supports a vertical shaft 71 on the vertical axis 52 with a bearing 72 interposed between them. The vertical shaft 71 supports a turner 70 fixed to it. In an exemplary embodiment, the turner 70 is rectangular in plan view and can be turned on the vertical axis 52 by an angular driver 73. The angular driver 73 includes a rotational drive 74, a driving pulley 76, a driven pulley 77, a timing belt (or a chain, a wire rope or the like) 78 and guide pulleys 79. The rotational drive 74 is mounted on the fixed end of the horizontal member 60B of the lift 60 and includes a driving shaft 75 extending downward from it. The driving and driven pulleys 76 and 77 are fixed to the driving and vertical shafts 75 and 71 respectively and connected by the timing belt 78. The guide pulleys 79 are supported by the horizontal member 60B. The rotational drive 74 includes a reversible motor and a speed reducer.

In an exemplary embodiment, the carrier 81 of the transferrer 51 may take the form of a running fork and consists of a horizontal supporting plate 81A, a positioning plate 81B and three positioning pins 82. The supporting plate 81A is supported on the turner 70 movably in parallel with the horizontal center line of the turner 70. The positioning plate 81B stands on a middle portion of the supporting plate 81A. The portion of the positioning plate 81A that is forward of the positioning plate 81B is a load support. The positioning pins 82 are fixed to peripheral points on the upper side of the load support. The carrier 81 can be protruded and retracted horizontally along the center line of the turner 70 by a horizontal driver 90.

The turner 70 is fitted with a pair of horizontal side members 83 and a horizontal guide rail 84 on its upper side. The side members 83 extend on both sides of and in parallel with the center line of the turner 70. The guide rail 84 extends through the vertical axis 52 between and in parallel with the side members 83. The rear end of the supporting plate 81A of the carrier 81 is fixed to the top of a horizontal slider 85, which is supported slidably on the guide rail 84. The horizontal driver 90 includes a horizontal screw shaft 91, a nut 92 and a rotational drive 94. The screw shaft 91 is supported in parallel with the guide rail 84 by the turner 70 and is in engagement with the nut 92, which is fixed to the bottom of the supporting plate 81A. The rotational drive 94 is mounted on the rear end of the turner 70 and connected to the screw shaft 91 by a belt transmission 93. The rotational drive 94 includes a reversible motor and a speed reducer.

Figure 4:
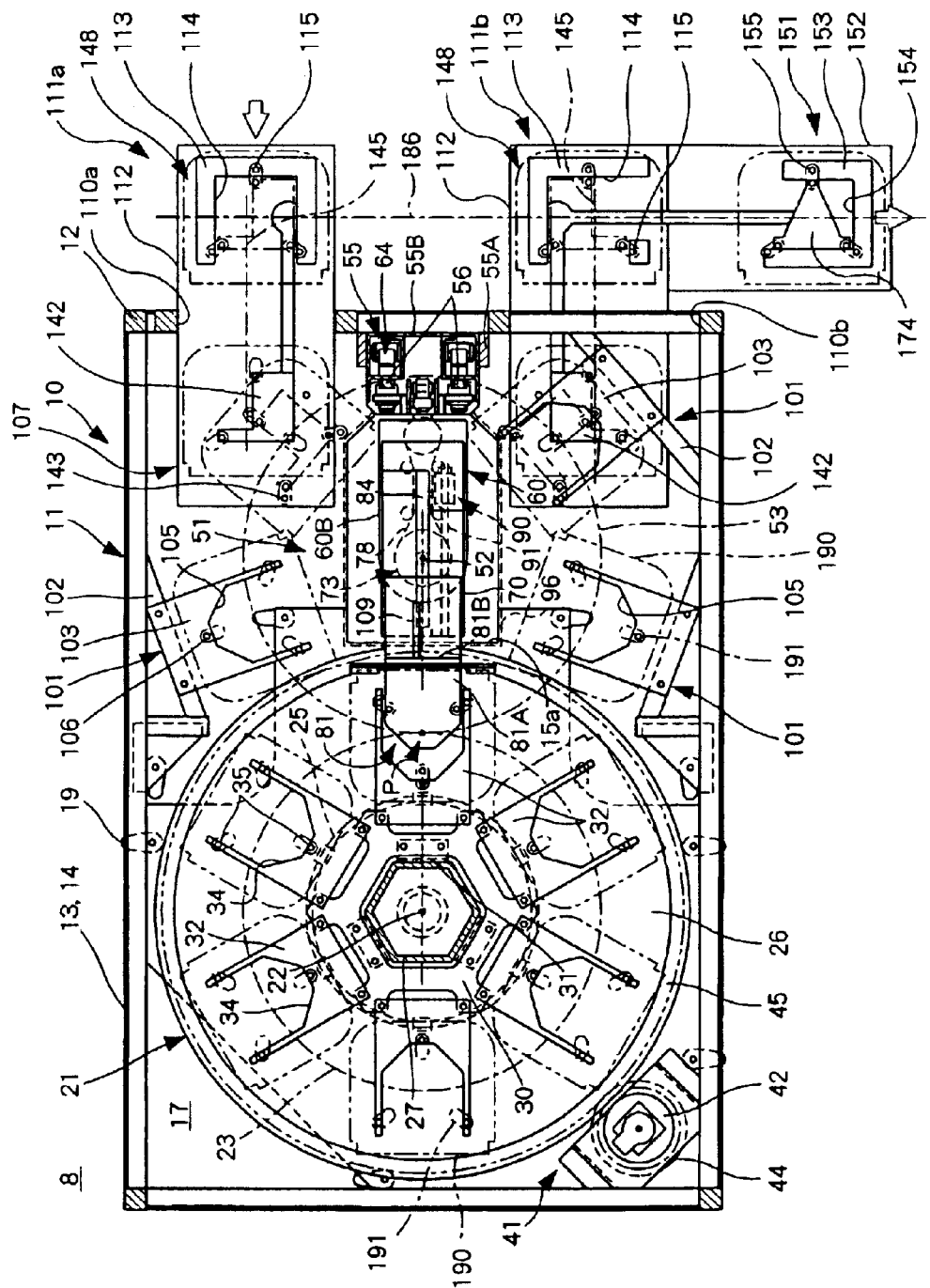
FIG. 4 is a top plan in horizontal section of each load storage apparatus of the storage equipment.
Figure 5:
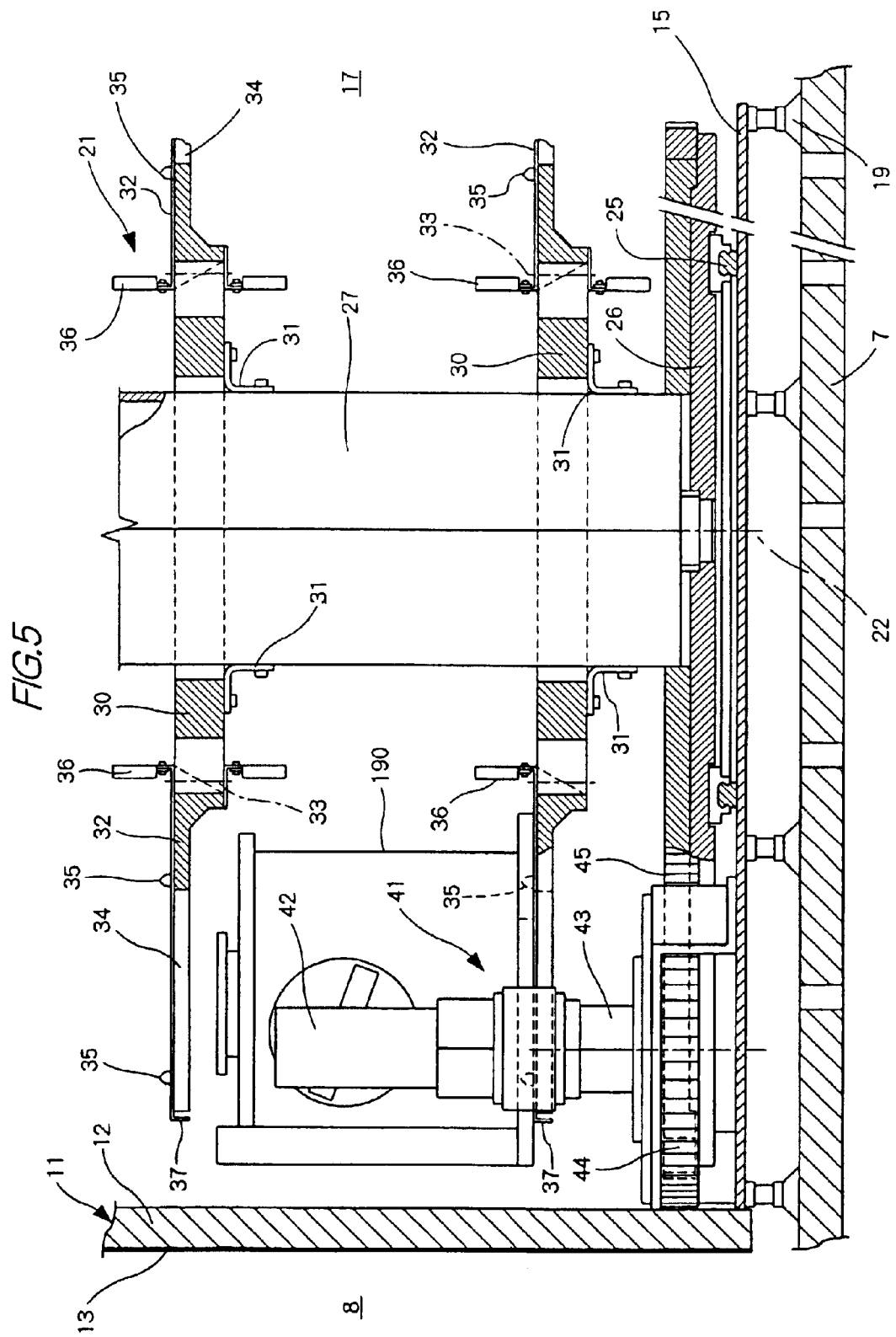
FIG. 5 is a side view partially in section of a lower portion of a rotary rack of the storage equipment.

The load support of the carrier 81 is so shaped and sized that it can move vertically through the recess 34 of each turning shelf 32 when the lift 60 vertically moves with the carrier 81 protruded from the turner 70. As shown in FIG. 4, in an exemplary embodiment, the cylindrical path 23 of each rotary rack 21 crosses at a transfer position P the vertical plane 109 extending through the vertical axes 22 and 52. It is possible to shift each of the turning shelves 32 to the associated transfer position P by turning the associated rotary rack 21 on its axis 22. The transferrer 51 has a cylindrical path 53, which is coaxial with the vertical axis 52 and extends through the upper and lower transfer positions P. When the carrier 81 is most protruded from the turner 70, the load support of the carrier 81 is positioned on the cylindrical path 53. When the carrier 81 is most protruded and in the upper or lower transfer positions P, its load support can move vertically through the recesses 34 of the turning shelves 32 in this position P. In FIG. 4, the carrier 81 is shown as positioned between its most protruded and most retracted positions.

The front side of the post 55 is fitted with a dust cover belt 87 for closing the space between the covers 58. The cover belt 87 does not prevent the lift 60 from vertically moving. The turner 70 is fitted with a dust cover belt 88 for closing the space over the guide rail 84. The cover belt 88 does not prevent the carrier 81 from horizontally protruding and retracting.

In an exemplary embodiment, the components and/or parts 54–94 compose the transferrer 51. The carrier 81 of the transferrer 51 can rotate about the vertical axis 52 and move vertically and radially of this axis 52.

With the carrier 81 facing toward the vertical axes 22 of the rotary racks 21 and most retracted in a position over the turner 70, the lift 60 can move vertically between the housings 11 on the stories 1 and 2 by passing through the openings 16a, 6a, 4a, 7a and 15a.

As shown in FIGS. 1–3, a vertical duct 96 extends between the two storage apparatuses 10 and is rectangular in horizontal section. The post 55 extends and the lift 60 moves vertically through the duct 96. The duct 96 extends through the openings 6a, 4a and 7a. The bottom of the duct 96 is connected to the top plate 16 around the opening 16a of the housing 11 on the lower story 2. The top of the duct 96 is connected to the base plate 15 around the opening 15a of the housing 11 on the upper story 1.

Figure 12:
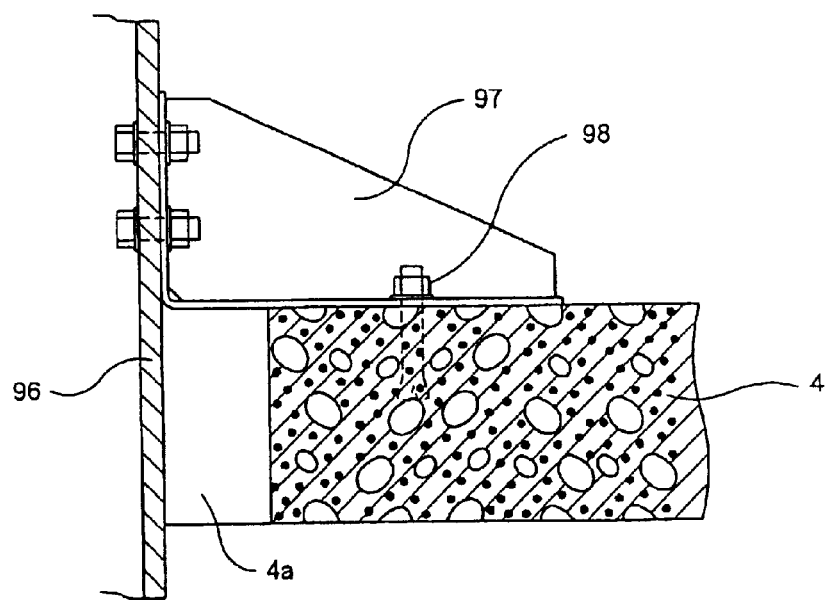
FIG. 12 is an enlarged portion of FIG. 1.

As shown in FIGS. 1 and 12, a middle portion of the duct 96 is supported by the intermediate floor slab 4 with brackets 97 and anchor bolts 98 or other fasteners. The duct 96 is positioned off the beams 9, which support the grating plate 7 on the upper story 1. This does not decrease the bearing strength for the grating plate 7.

Thus, the two storage chambers 17 communicate with each other through the vertical duct 96, through which the transferrer 51 extends between the two storage apparatuses 10. This isolates the transferrer 51 together with the storage apparatuses 10 from the clean rooms 8. Consequently, the clean rooms 8 are kept from being contaminated with dust scattered by the operation of the rotary racks 21 and the transferrer 51.

As shown in FIGS. 3, 4, 10 and 11, the fixed racks 101 of each storage apparatus 10 are arranged around the transferrer 51 in the associated storage chamber 17. Each of the fixed racks 101 may include fixed shelves 103 arranged at vertical intervals, which may be regular intervals. One end of each fixed shelf 103 is fixed with connectors 104 to a horizontal supporting member 102, which is fixed to the framework 12 of the associated housing 11. The fixed shelves 103 protrude in the form of cantilevers horizontally toward the vertical axis 52 of the transferrer 51.

The fixed shelves 103 are similar or identical in structure to the turning shelves 32 and each have a recess 105, which is open toward the vertical axis 52 of the transferrer 51. Each fixed shelf 103 is fitted with positioning pins 106 (three pins in the present embodiment) on its upper side around its recess 105. In other words, each fixed shelf 103 may be equivalent to one turning shelf 32 that would have turned from the associated transfer position P around the vertical axis 52. The load support of the carrier 81 can move vertically through the recess 105 of each fixed shelf 103, as is the case with the turning shelves 32 in the transfer positions P, when the lift 60 vertically moves with the carrier 81 most protruded. The components and/or parts 102–106 compose the fixed racks 101, which may consist of other components and/or parts.

As shown in FIGS. 1, 3, 4, 10 and 13–16, two port spaces 107 are formed each under one of the two fixed racks 101 of each storage apparatus 10 that are far from the associated rotary rack 21. Each port space 107 may be equivalent in vertical size to the lowest three fixed shelves 103 of each of the other two fixed racks 101. The port spaces 107 are used for the formation of an inlet port 111*a* and an outlet port 111*b*. Loads can be transferred from the inlet port 111*a* to the transferrer 51, and from the transferrer 51 to the outlet port 111*b*.

Specifically, the lower wall 13 of each housing 11 may be formed with an inlet opening 110*a* and an outlet opening 110*b* both through it, each of which adjoins one of the associated port spaces 107. The associated ports 111*a* and 111*b* extend through the openings 110*a* and 110*b* respectively.

Each of the ports 111*a* and 111*b* may be fitted with a box frame 112, which extends through the associated housing opening 110*a* or 110*b*. The box frame 112 is fitted with a temporary support 113 over an outer end portion thereof. The temporary support 113 is one or two plates surrounding an operating space 114, and is fitted with three positioning pins 115 on its upper side.

The box frame 112 houses a pair of horizontal guide rails 116, a carriage 117 and a horizontal driver 118. The guide rails 116 extend in parallel with the vertical plane 109 (FIG. 4), which extends through the vertical axes 22 and 52. The horizontal driver 118 reciprocates the carriage 117 on the guide rails 116 and consists of a drive 119 such as a motor, a timing pulley 121, a pair of guide pulleys 122 and a timing belt 123. The drive 119 is mounted in the carriage 117 and includes a horizontal output shaft 120, to which the timing pulley 121 is fixed. The timing belt 123 extends in parallel with the guide rails 116 and is fixed at both ends to the box frame 112 with brackets 124. The guide pulleys 122 are supported by the carriage 117 to engage the timing belt 123 with the timing pulley 121.

The carriage 117 includes a vertical driver 125, which consists of a bearing 126, a vertical screw shaft 127, a reversible drive 128 such as a motor, a transmission 130 such as a belt or a chain, a nut 131 and a guide 132. The screw shaft 127 is supported by the carriage 117 with the bearing 126 interposed between them. The reversible drive 128 is mounted in the carriage 117 and includes an output shaft 129 extending downward from it. The shafts 129 and 127 are in driving connection through the transmission 130. The screw shaft 127 and the nut 131 are in mutual engagement. The guide 132 guides the nut 131 moving vertically and prevents it from revolving. The nut 131 supports a lift 133.

The lift 133 is fitted with an angular driver 135, which consists of a supporting member 136, a bearing 137, a vertical shaft 138, a reversible drive 139 such as a motor and a transmission 141 such as a belt or a chain. The lift 133 supports the supporting member 136, which supports the vertical shaft 138 with the bearing 137 interposed between them. The supporting member 136 also supports the reversible drive 139, which includes an output shaft 140 extending upward. The shafts 140 and 138 are in driving connection through the transmission 141. The box frame 112 includes a top plate, which has a long opening. The vertical shaft 138 extends through the long opening and supports a load support 142 in the form of a horizontal plate on its top. The load support 142 can move horizontally into and out of and vertically through the operating space 114, which is surrounded by the temporary support 113. The load support 142 is fitted with positioning pins 142*a* (in the present embodiment, three pins) on a peripheral portion of its upper side.

The top plate of the box frame 112 is fitted with positioning pins 143 (in the present embodiment, three pins) near its inner end for positioning a load at a predetermined level over it. Each of the positioning pins 143 protrudes upward from a seat fixed to the top plate. The components and/or parts 112–145 compose the ports 111*a* and 111*b*, which may consist of other components and/or parts.

One side of an outer end portion 148 of the outlet port 111*b* is connected to a means of storage 151, which includes a box frame 152. The inner end of the box frame 152 is connected to the outer side of the outer portion of the box frame 112 of the outlet port 111*b*. The box frame 152 is fitted with a temporary support 153 over an outer end portion of it. The temporary support 153 is a plate surrounding an operating space 154, and is fitted with positioning pins 155 (in the present invention, three pins) on its upper side.

The box frame 152 houses a pair of horizontal guide rails 156, a carriage 157 and a horizontal driver 158. The guide rails 156 extend perpendicularly to the guide rails 116 of the ports 111*a* and 111*b*. The horizontal driver 158 reciprocates the carriage 157 on the guide rails 156. The horizontal driver 158 is similar to the horizontal drivers 118 of the ports 111*a* and 111*b* and consists of a drive 159, an output shaft 160, a timing pulley 161, a pair of guide pulleys 162 and a timing belt 163. The timing belt 163 is fixed at both ends to the box frame 152 with brackets 164.

The carriage 157 includes a vertical driver 165, which is similar to the vertical drivers 125 of the ports 111*a* and 111*b*. The vertical driver 165 consists of a bearing 166, a vertical screw shaft 167, a drive 168, an output shaft 169, a transmission 170, a nut 171 and a guide 172. The nut 171 supports a lift 173, which supports a vertical shaft. This shaft supports a load support 174 in the form of a horizontal plate on its top. The load support 174 can move horizontally into and out of and vertically through the operating space 154, which is surrounded by the temporary support 153, and the operating space 114 of the outlet port 111*b*. The load support 174 is fitted with three positioning pins 174*a* on a peripheral portion of its upper side. The components and/or parts 152–174 compose the means of storage 151, which may consist of other components and/or parts.

As shown in FIG. 1, the upper storage apparatus 10 also has a middle inlet port 111*a* and a middle outlet port 111*b*, which are similar in structure to the lower ports 111*a* and 111*b* respectively. The upper clean room 8 houses a conveyor 181, which extends over the outer end portions 148 of the middle ports 111*a* and 111*b*. Of course, as shown in FIG. 3, the lower clean room 8 may house a conveyor 181 (not shown in FIG. 1), which extends over the outer end portions 148 of the associated ports 111*a* and 111*b*.

Each of the conveyors 181 conveys cassettes 190, which may contain processed items, or other loads to and from the ports 111*a* and 111*b* just under it. Each conveyor 181 consists of a horizontal rail 182, a carriage 183 and a load holder 184. The horizontal rail 182 is supported over the outer end portions 148 of the ports 111*a* and 111*b* and supports the carriage 183, which is hung from the rail 182 and can automatically move along it. The load holder 184 is fitted to the bottom of the carriage 183 and includes a hanger or suspender 185, which can vertically move and includes a gripper.

Each of the cassettes 190 has bottom slots 191 (in the present embodiment, three slots) formed for simultaneously engaging with inner and outer positioning pins 35, 82, 106, 115, 142a, 143, 155 and/or 174a when the cassettes 190 are transferred at various places.

In an exemplary embodiment, the storage apparatuses 10 can be used in the following way.

A cassette 190 handled in each of the clean rooms 8 can be stored in the associated storage apparatus 10 by first being placed on the temporary support 113 in the outer end portion 148 of the associated inlet port 111a.

The cassette 190 may be conveyed to the inlet port 111a manually or by the associated conveyor 181. If the conveyor 181 is used, its load holder 184 holds the cassette 190, with its gripper gripping the cassette. Then, the carriage 183 of the conveyor 181 is stopped in the unloading position over the outer end portion 148 of the inlet port 111a. Subsequently, the hanger 185 of the holder 184 is lowered until the cassette 190 rests on the temporary support 113 of the inlet port 111a, as shown with two-dot chain lines E in FIG. 13, in such a manner that outer end portions of the bottom slots 191 of this cassette engage with the positioning pins 115 of this support 113. Thereafter, the gripper releases the resting cassette 190, and the empty hanger 185 is lifted to its top position. Then, the empty carriage 183 can be moved. Inner end portions of the bottom slots 191 of the resting cassette 190 are positioned in the operating space 114 within the temporary support 113. In the meantime, the load support 142 of the inlet port 111a stands by in its lowest normal position under the operating space 114.

Next, the drive 128 of the vertical driver 125 of the inlet port 111a is activated to rotate the associated screw shaft 127 through the associated transmission 130, lifting the associated nut 131, lift 133 and angular driver 135. This lifts the load support 142 through the operating space 114, lifting the cassette 190 from the temporary support 113, as shown with two-dot chain lines in FIG. 14. The positioning pins 142a of the lifted support 142 engage with the inner end portions of the bottom slots 191 of the cassette 190.

Figure 10:
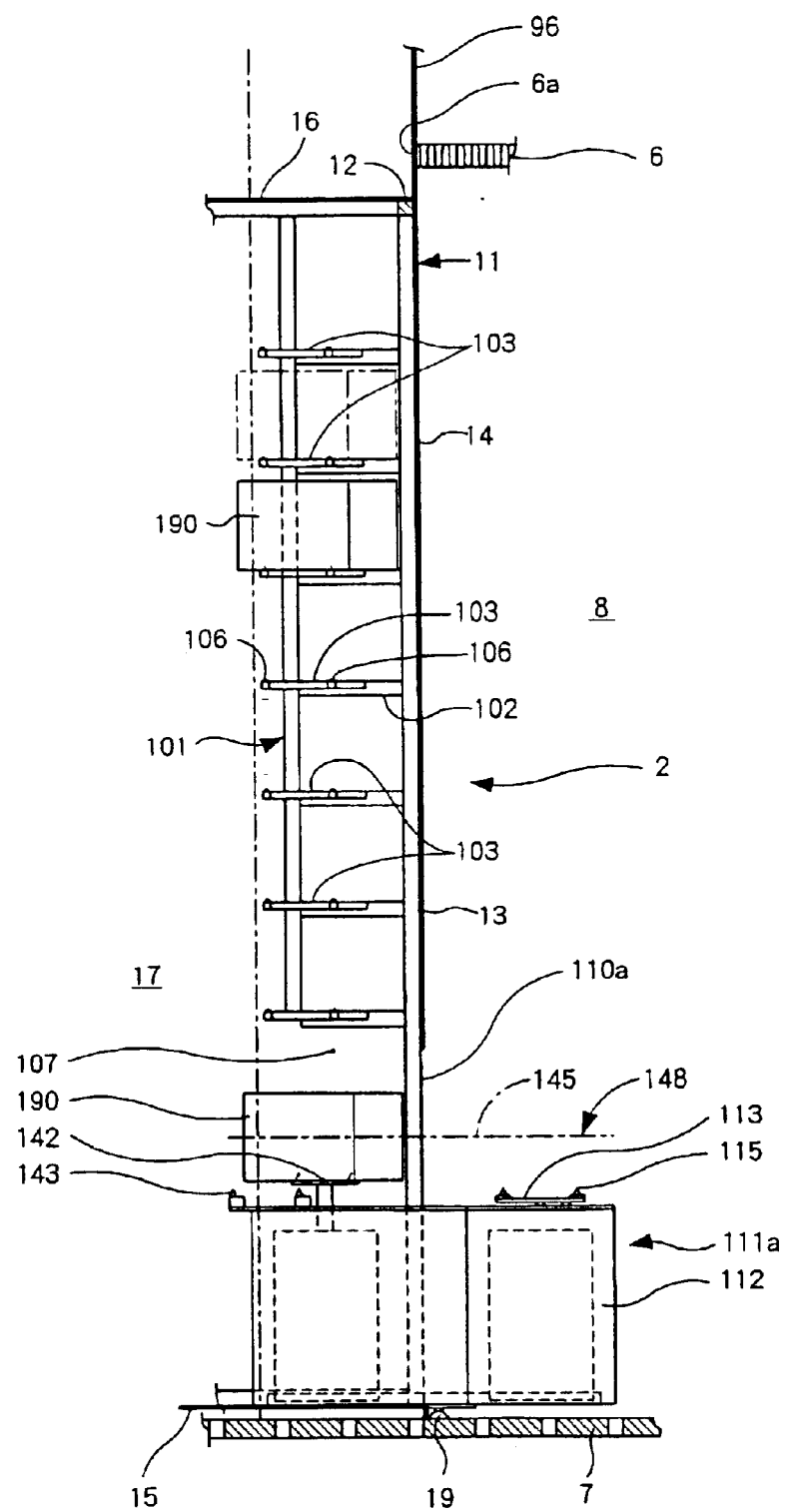
FIG. 10 is a side view of a fixed rack of the storage equipment.
Figure 11:
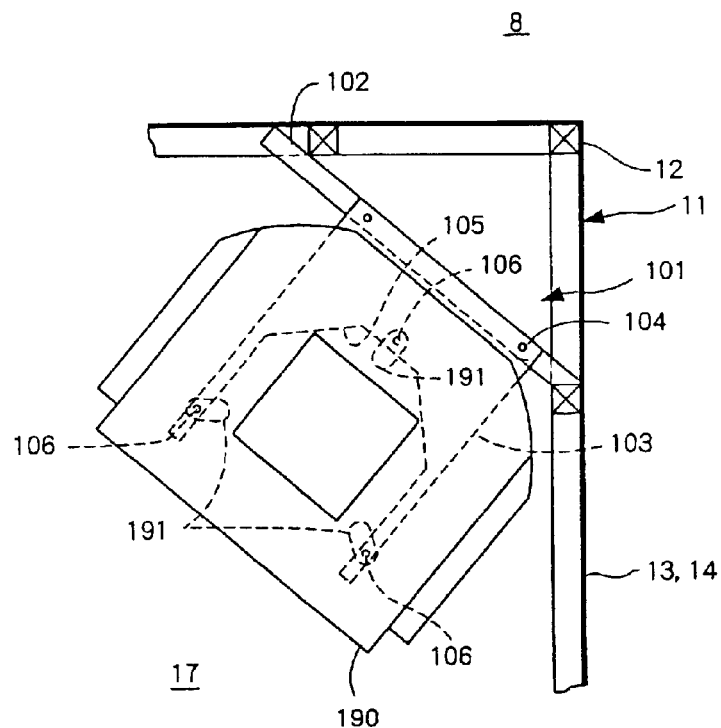
FIG. 11 is a top plan of the fixed rack.

Next, the drive 119 of the horizontal driver 118 of the inlet port 111a is activated to rotate the associated timing pulley 121 so as to move the associated carriage 117 together with the lifted load support 142 along the associated guide rails 116 toward the inner end of the inlet port 111a. The moved load support 142 carries the cassette 190 on it through the associated inlet opening 110a into the associated storage chamber 17. The carriage 117 is moved until the cassette 190 on the load support 142 reaches a position F (FIG. 13) adjacent to the inner end of the inlet port 111a. The position F is in the associated port space 107, as shown in FIG. 10.

Figure 13:
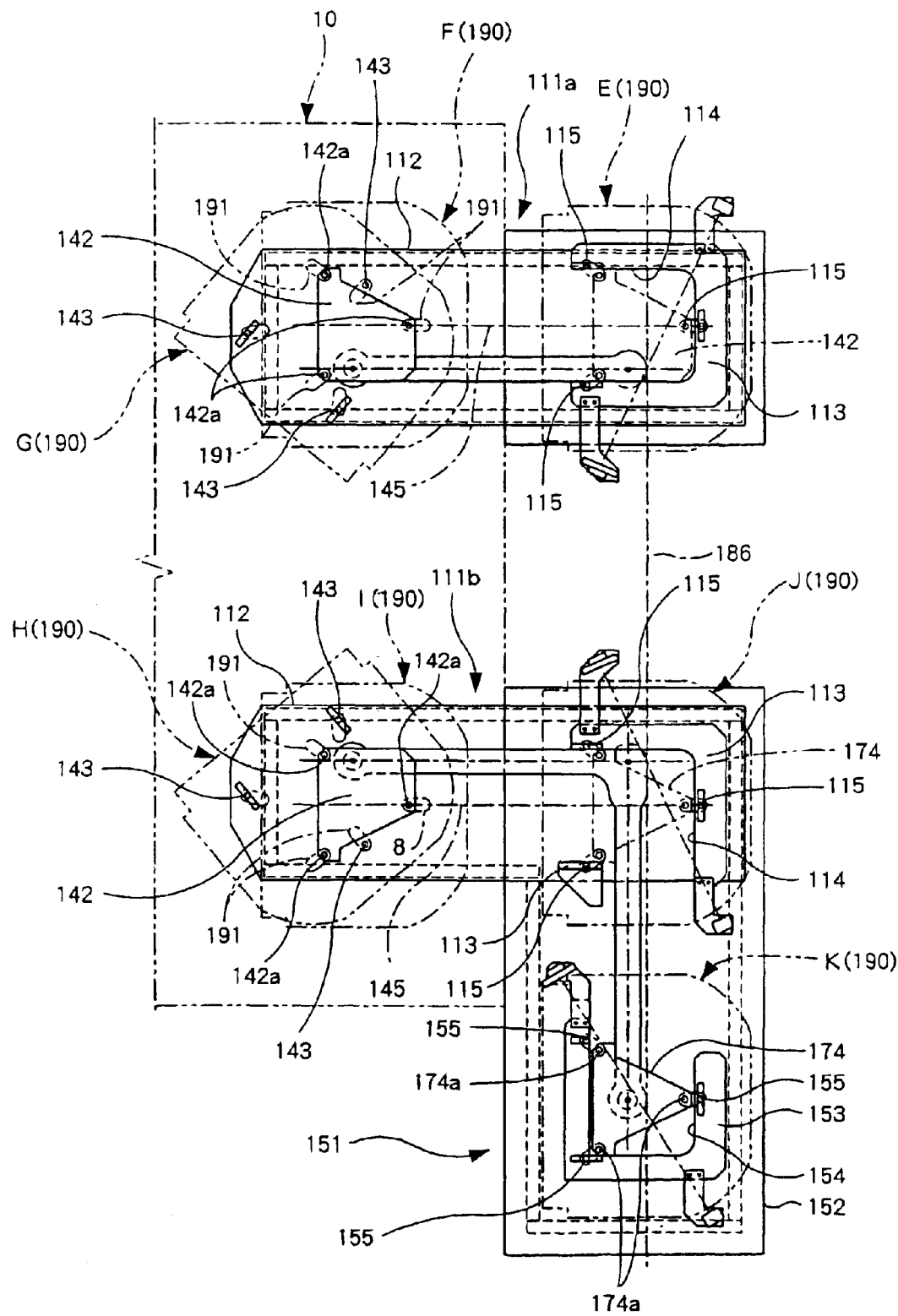
FIG. 13 is a top plan of an inlet port and an outlet port of the storage equipment.
Figure 14:
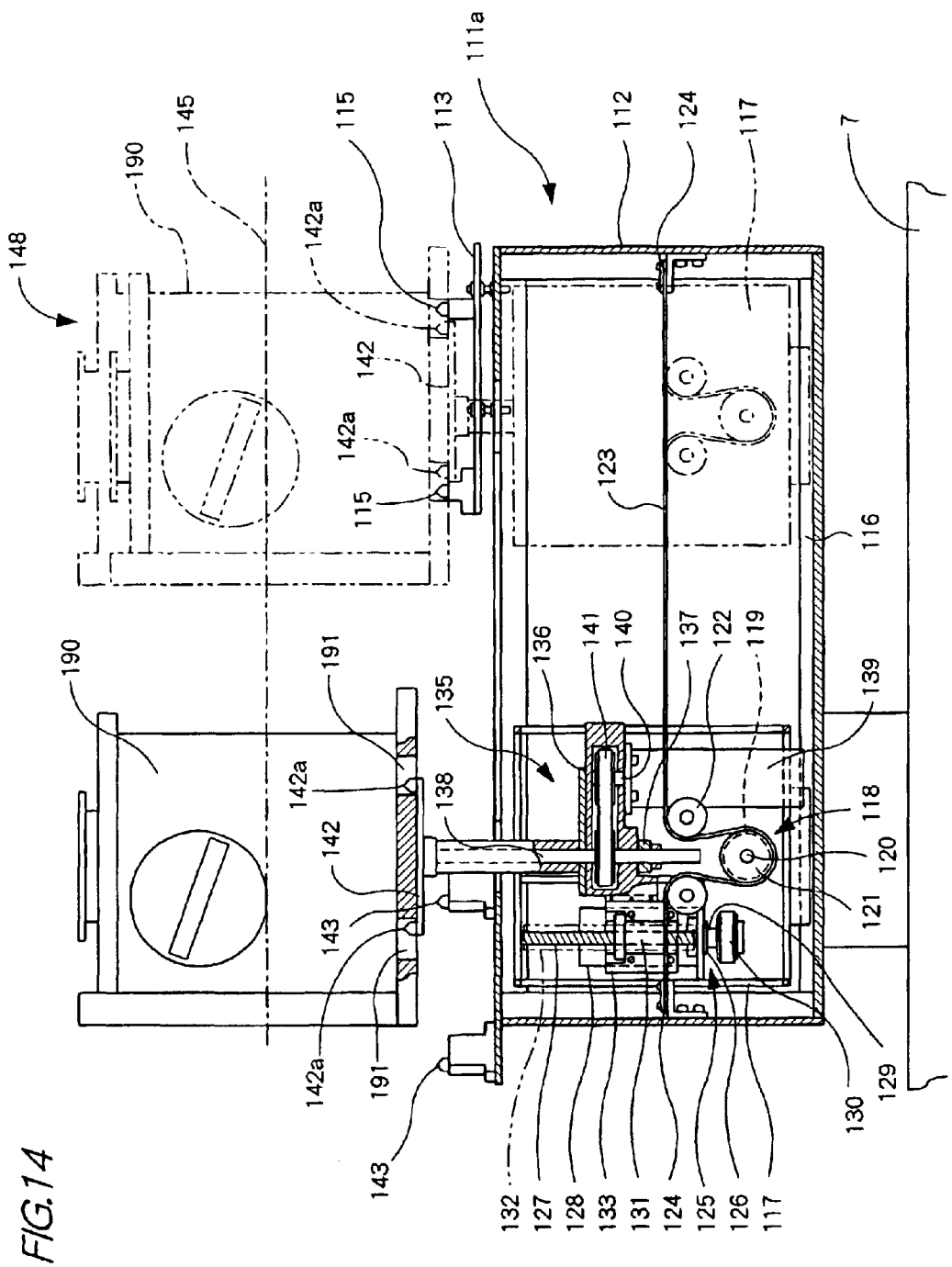
FIG. 14 is a side view partially in section of the inlet port.
Figure 15:
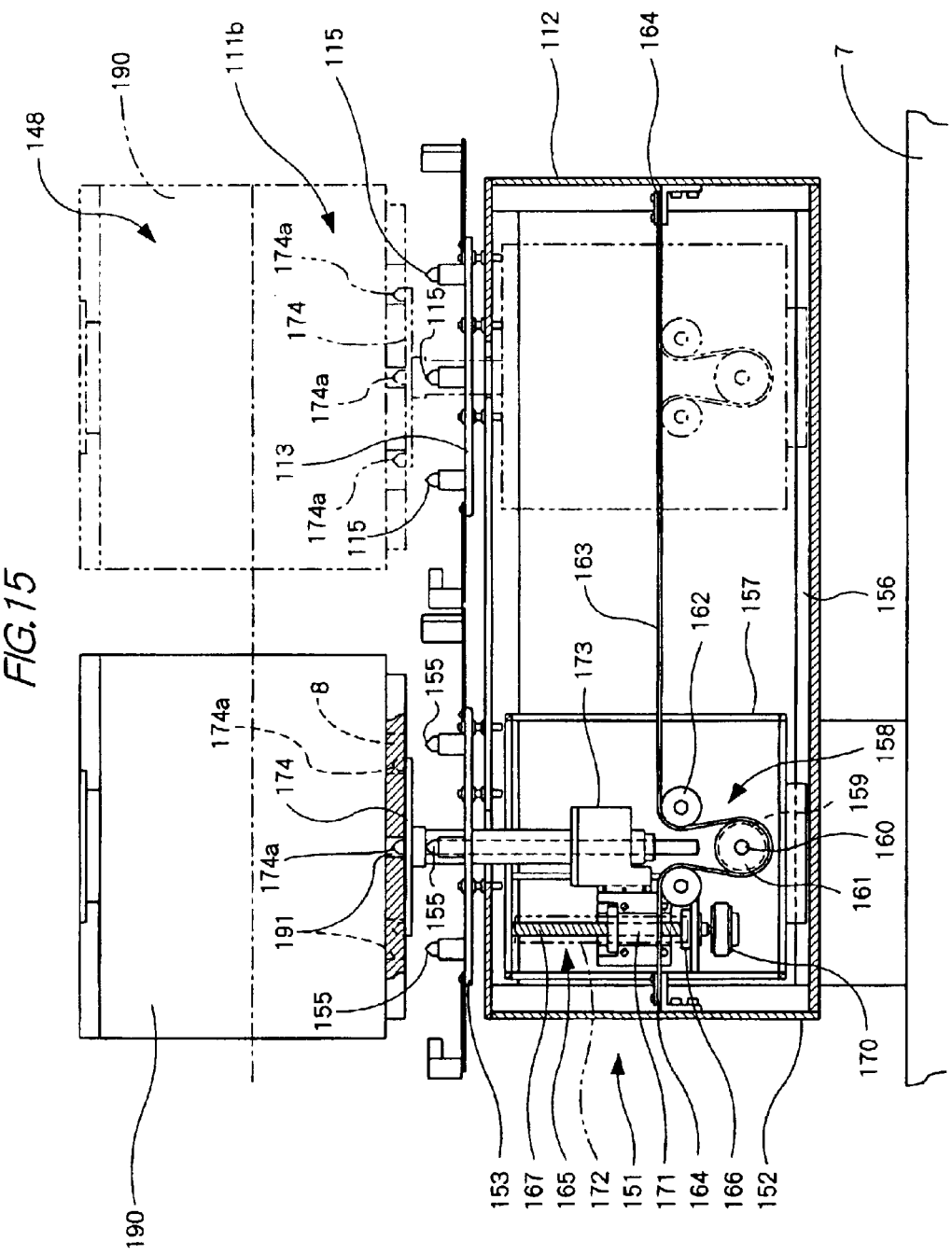
FIG. 15 is a front view partially in section of the outlet port and the adjoining means of storage.
Figure 16:
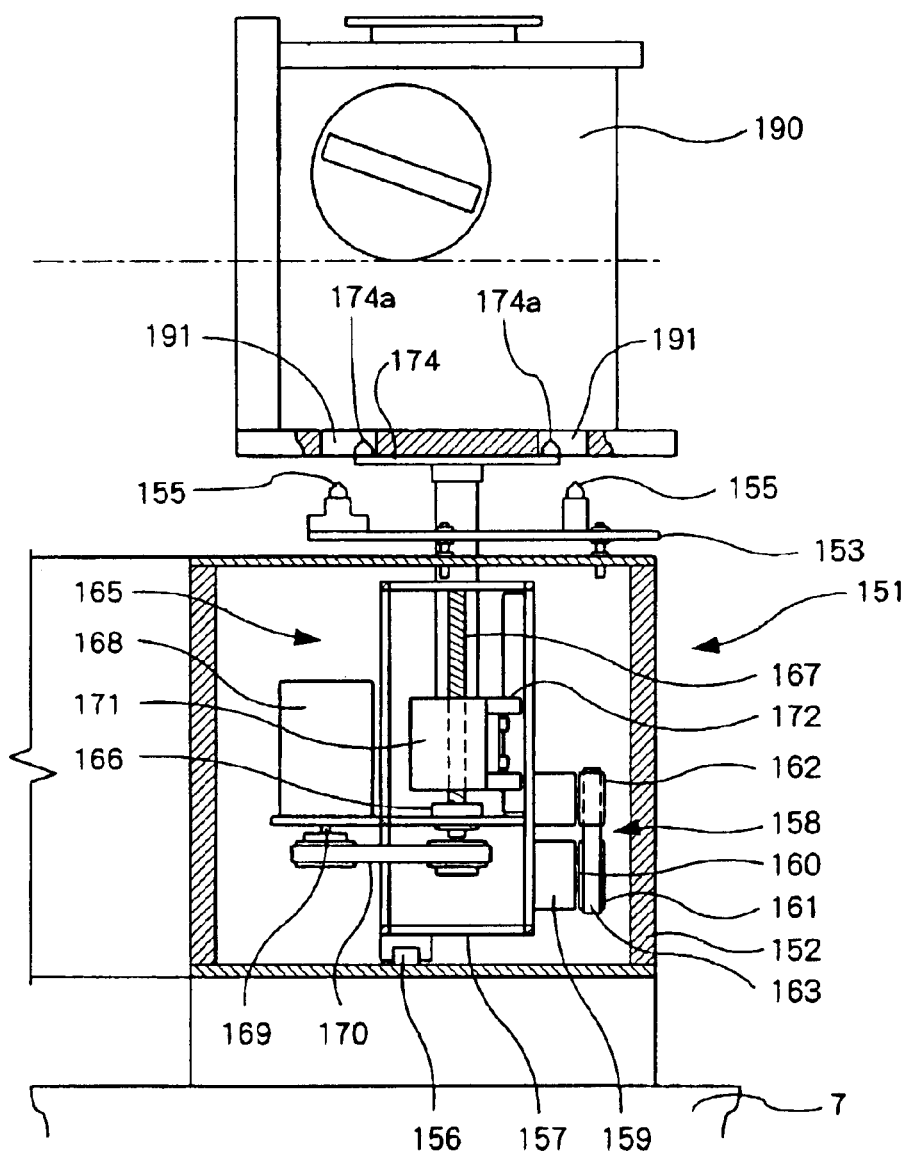
FIG. 16 is a side view partially in section of the means of storage.

Next, the drive 139 of the angular driver 135 of the inlet port 111a is activated to drive the associated transmission 141, turning the associated vertical shaft 138 and the load support 142 to shift the cassette 190 in the position F to a position G (FIG. 13). The position G coincides vertically with the positions where cassettes 190 can be supported on the fixed shelves 103 of the fixed rack 101 over the port space 107.

Next, the drive 128 of the vertical driver 125 is activated to rotate the screw shaft 127 in the opposite direction, lowering the nut 131 with the lift 133, the angular driver 135 and the load support 142. While the load support 142 is lowered inside the positioning pins 143 on the associated box frame 112, the outer end portions of the bottom slots 191 of the cassette 190 on this support 142 engage with the positioning pins 143. This positions the cassette 190 at a predetermined level over the top plate of the box frame 112. In the meantime, the load support 142 leaves the bottom of the cassette 190 and is lowered to its lowest position.

After the load support 142 is unloaded, the drive 139 of the angular driver 135 is actuated to turn the vertical shaft 138 in the opposite direction so as to return the support 142 to the normal position. Next, the drive 119 of the horizontal driver 118 is activated to rotate the timing pulley 121 in the opposite direction so as to move the carriage 117 together with the load support 142 to the outer end portion of the inlet port 111a. This returns the load support 142 in the lowest normal position to the stand-by position under the operating space 114 within the temporary support 113. In the present embodiment, the return ends the process for carrying the cassette 190 into the storage chamber 17.

Thus, the cassette 190 is supported on the seats for the positioning pins 143 in the inner end portion of the inlet port 111a. The supported cassette 190 can be transferred to the transferrer 51, with the carrier 81 empty and retracted in its home position over the turner 70, as shown with solid lines in FIG. 7. Suitably as the need arises, the empty carrier 81 may be turned with the turner 70 and/or moved vertically with the lift 60 to shift to its receiving position adjacent to the inner end of the inlet port 111a.

The carrier 81 can be turned with the turner 70 in opposite directions around the vertical axis 52 by the rotational drive 74 of the angular driver 73 driving the driving shaft 75, the driving pulley 76, the timing belt 78, the driven pulley 77 and the vertical shaft 71.

The carrier 81 can be moved vertically with the vertical sliders 59 and the lift 60 moved along the vertical guide rails 56 by the rotational drive 66 of the vertical driver 61 driving the driving shaft 68, the driving pulleys 62 and the timing belts 64.

By thus turning and/or vertically moving the empty carrier 81 suitably as the need arises, it is possible to shift the carrier 81 to the receiving position, which is adjacent to the inner end of the inlet port 111a. The positioning pins 82 on the carrier 81 in the receiving position are slightly lower than the bottom of the cassette 190 supported on the seats for the positioning pins 143 on the box frame 112.

Figure 7:
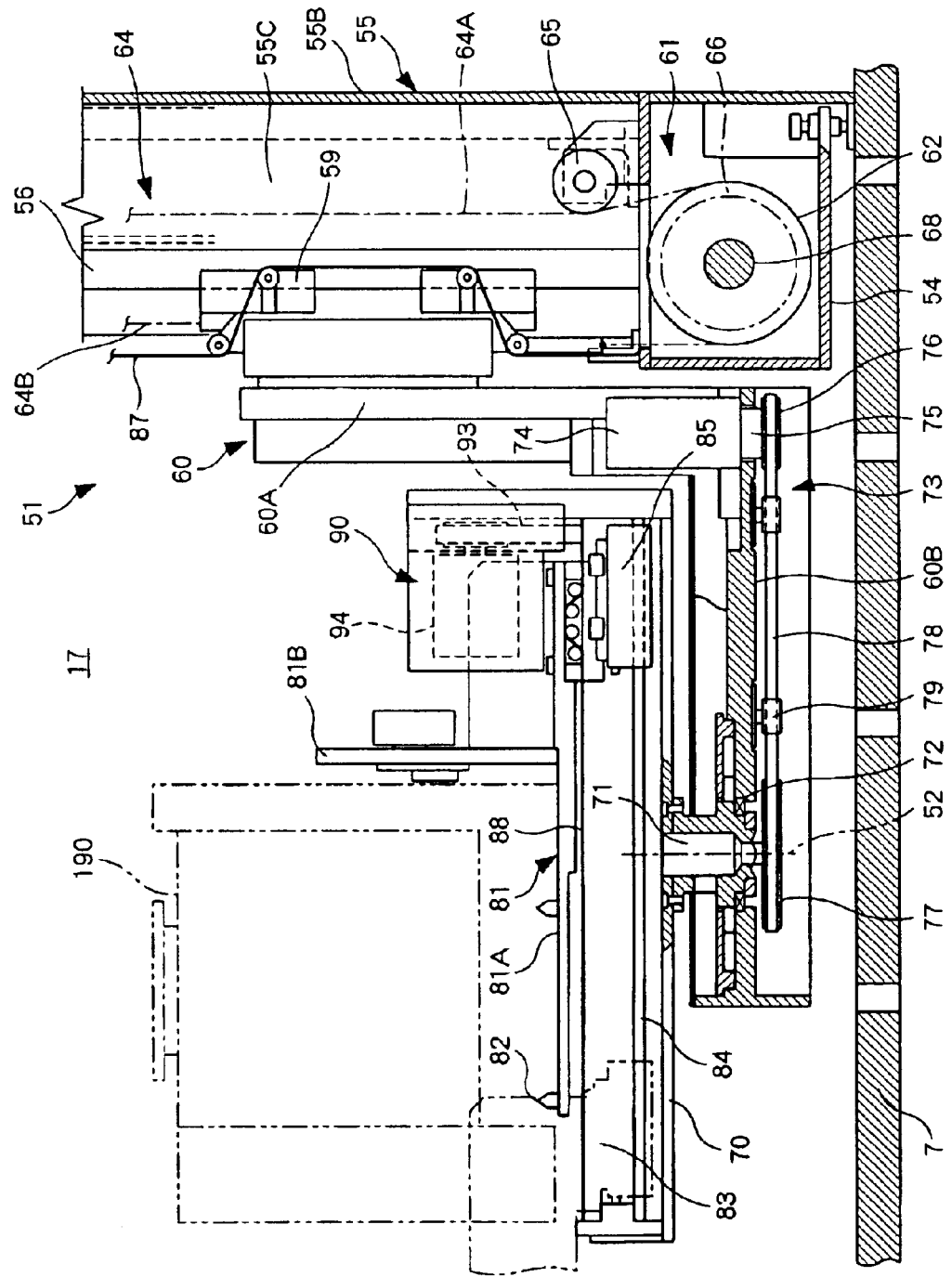
FIG. 7 is a side view partially in section of a lower portion of the transferrer of the storage equipment.

Next, the carrier 81 is protruded from its home position by being linearly moved with the horizontal slider 85 guided by the guide rail 85, to its most protruded position shown with two-dot chain lines in FIG. 7. The carrier 81 can be protruded by the rotational drive 94 of the horizontal driver 90 driving the belt transmission 93 and the screw shaft 91 to move the nut 92. The load support of the protruded carrier 81 is positioned just under the cassette 190 supported on the seats for the positioning pins 143 in the inner end portion of the inlet port 111a.

Next, the vertical driver 61 is activated to slightly lift the carrier 81 with the lift 60 so that the carrier 81 can support the cassette 190 with its positioning pins 82 engaging with the inner end portions of the bottom slots 191 of the cassette 190. In the meantime, the cassette slots 191 disengage upward from the positioning pins 143 on the box frame 112. Thereafter, the horizontal driver 90 is activated to retract the lifted carrier 81, moving the supported cassette 190 to a predetermined position over the turner 70.

Next, suitably as the need arises, the retracted carrier 81 is turned and/or vertically moved in the foregoing way to carry the cassette 190 on it to a sending position adjacent to a target fixed shelf 103 of the associated fixed racks 101. The bottom of the cassette 190 in the sending position is slightly higher than the positioning pins 106 of the fixed shelf 103.

Next, the carrier 81 is protruded from the turner 70 to send the cassette 190 on it to a predetermined position over the fixed shelf 103. The protruded carrier 81 is then lowered slightly to transfer the cassette 190 onto the fixed shelf 103 in such a manner that the outer end portions of the bottom slots 191 of the cassette 190 engage with the positioning pins 106 of the fixed shelf 103. In the meantime, the positioning pins 82 of the carrier 81 disengage downward from the cassette slots 191. The lowered empty carrier 81 is then retracted to its home position over the turner 70. In the present embodiment, the retraction ends the process for loading the fixed shelf 103.

Alternatively, the cassette 190 in the inner end portion of the inlet port 111a can be stored in the associated rotary rack 21. In this case, while the carrier 81 of the transferrer 51 is receiving the cassette 190 supported on the seats for the positioning pins 143 in the inner end portion of the inlet port 111a, the rotary rack 21 can be turned in advance for storage preparation.

The rotary rack 21 can be turned in opposite directions by the rotational drive 42 of its rack driver 41 driving the associated driving shaft 43, driving gear 44, ring gear 45 and hexagonal column 27. This turns the turning shelves 32 of the rotary rack 21 around its vertical axis 22. The rotary rack 21 is turned until a target turning shelf 32 reaches the transfer position P on the associated cylindrical path 23.

It is possible to shorten the required time for storage preparation by turning the rotary rack 21 within an angular range of 180 degrees in the direction for the smaller angle between the current position of the target turning shelf 32 and the transfer position P. It is also possible to raise the operating efficiency of the whole apparatus by turning the rotary rack 21 in advance for storage preparation while the carrier 81 of the transferrer 51 is receiving the cassette 190 from the inlet port 111a. As a matter of course, if the target turning shelf 32 is already in the transfer position P, the rotary rack 21 does not need to turn.

Figure 6:
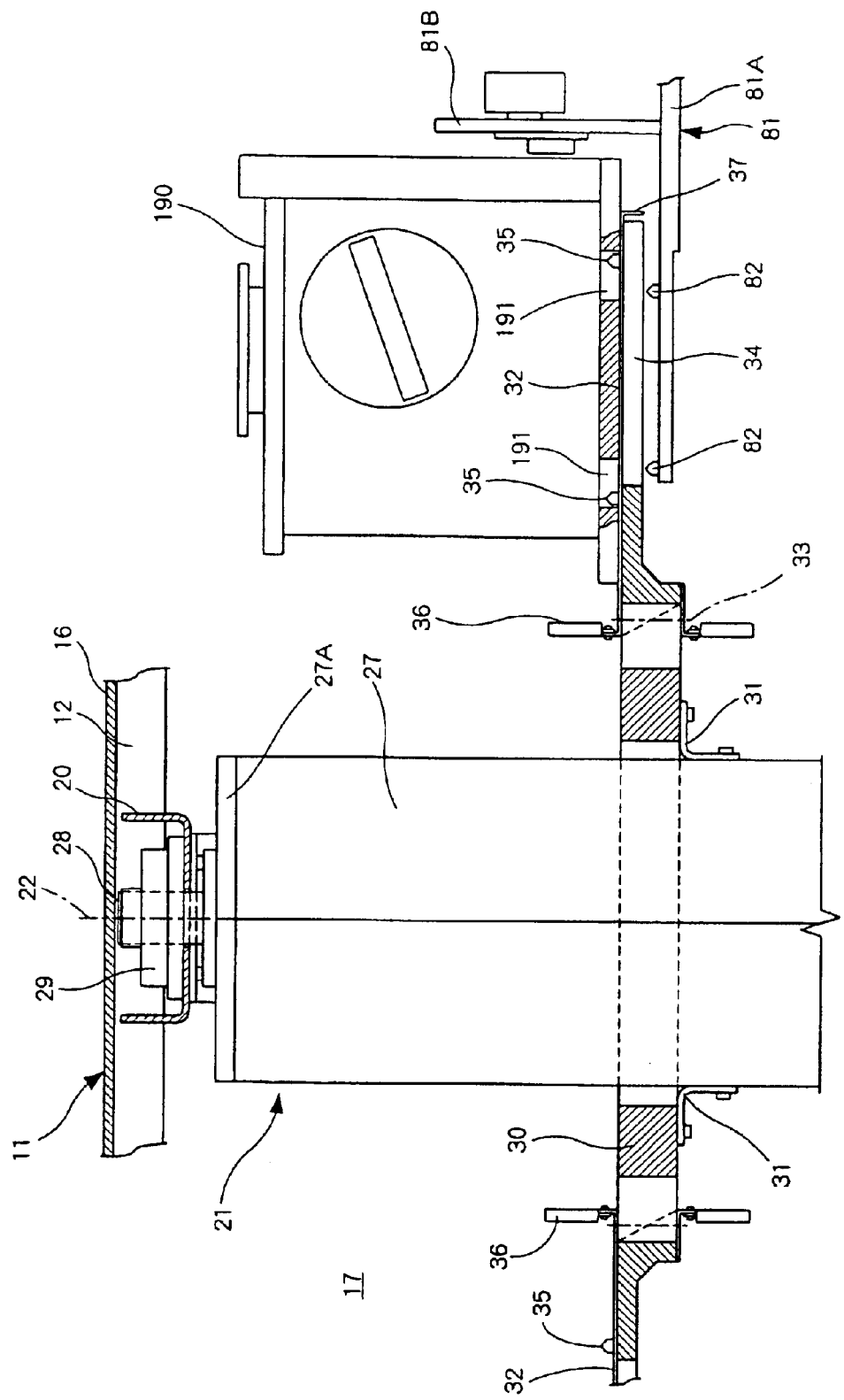
FIG. 6 is a side view partially in section of an upper portion of the rotary rack.

After the target turning shelf 32 is turned to the transfer position P, where it stands by, the transferrer 51 operates for it in a way similar to that for the fixed shelves 103, in such a manner that the cassette 190 on the carrier 81 can be transferred onto the turning shelf 32, as shown in FIGS. 4 and 6. The outer end portions of the bottom slots 191 of the transferred cassette 190 engage with the positioning pins 35 on the turning shelf 32. The unloaded carrier 81 is then retracted from its position below the turning shelf 32 to its home position over the turner 70. The retraction ends the process for loading the turning shelf 32.

The cassettes 190 supported on a target turning shelf 32 in one of the transfer positions P and a target fixed shelf 103 of the associated fixed rack 101 can be carried to the associated outlet port 111b in the following way.

The transferrer 51 reverses its loading operation so that the carrier 81 can receive a cassette 190 from any one of the rotary and fixed racks 21 and 101. First, the carrier 81 is protruded to a lifting position under the cassette 190 on the target shelf 32 or 103. The protruded carrier 81 is then lifted to support the cassette 190. The lifted and loaded carrier 81 is then retracted to its home position over the turner 70. The retracted carrier 81 is then turned and/or vertically moved to a sending position adjacent to the inner end of the outlet port 111b. The bottom of the cassette 190 on the carrier 81 in the sending position is slightly higher than the positioning pins 143 of the outlet port 111b.

Next, the carrier 81 is protruded relative to the turner 70 to move the cassette 190 to a predetermined position over the positioning pins 143 of the outlet port 111b. The protruded carrier 81 is then lowered so that the seats for the positioning pins 143 can support the cassette 190, with these pins 143 engaging with the outer end portions of the bottom slots 191 of the supported cassette 190. In the meantime, the positioning pins 82 of the carrier 81 disengage downward from the cassette slots 191. The unloaded carrier 81 is then retracted to its home position. The retraction ends the process for carrying the cassette 190 from the target shelf 32 or 103 to the outlet port 111b.

Thereafter, the outlet port 111b operates reversely to the inlet port 111a to shift the cassette 190 on the seats for the positioning pins 143 onto the temporary support 113 in the outer end portion of the outlet port 111b. The cassette shift requires that the load support 142 of the outlet port 111b should in advance stand by in a receiving position, as shown with two-dot chain lines H in FIG. 13, just under the cassette 190 supported on the seats for the positioning pins 143. The load support 142 is then lifted slightly to support the cassette 190, with its positioning pins 142a engaging with the inner end portions of the bottom slots 191 of the cassette 190. In the meantime, the cassette slots 191 disengage upward from the positioning pins 143 of the outlet port 111b.

Next, the loaded load support 142 is turned to a normal position as shown with two-dot chain lines I in FIG. 13. Thereafter, the associated carriage 117 is moved together with the load support 142 along the associated guide rails 116 to the outer end portion of the outlet port 111b. The moved load support 142 carries the cassette 190 on it through the associated outlet opening 110b out of the associated storage chamber 17. When the load support 142 reaches a predetermined position in the outer end portion of the outlet port 111b and stops there, this support 142 is positioned just above the associated temporary support 113. The positioned load support 142 is then lowered through the operating space 114 within the temporary support 113 to its lowest position. This transfers the cassette 190 on the load support 142 to the temporary support 113 in such a manner that the outer end portions of the bottom slots 191 of the cassette 190 can engage with the positioning pins 115 on the temporary support 113. In the meantime, the positioning pins 142a of the load support 142 disengage downward from the cassette slots 191. This ends the process for carrying the cassette 190 out of the storage chamber 17.

Part of the loading process and part of the unloading process may be combined to transfer cassettes 190 from the fixed racks 101 to any turning shelves 32, and from the rotary rack 21 to any fixed shelves 103, by means of the transferrer 51. There may be a need to transfer the cassette 190 on one of the fixed shelves 103 to one of the turning shelves 32 outside the transfer position P of the rotary rack. In this case, it is possible to raise the operating efficiency of the whole apparatus by turning the rotary rack 21 in advance for storage preparation while the transferrer 51 is receiving the cassette 190 from the fixed shelf 103.

The means of storage 151 of each storage apparatus 10 enables the cassette 190 on the temporary support 113 of the outer end portion of the associated outlet port 111b to temporarily stand by. First, the carriage 157 of the means of storage 151 is moved to the outlet port 111b to shift the associated load support 174 in its lowest position to a predetermined position under the operating space 114 within the temporary support 113. As shown with two-dot chain lines in FIG. 15, the shifted load support 174 is then lifted to support the cassette 190 in such a manner that the positioning pins 174a on this support 174 can engage with the inner end portions of the bottom slots 191 of the cassette 190. In the meantime, the cassette slots 191 disengage upward from the positioning pins 115 on the temporary support 113. Thereafter, the carriage 157 is moved with the loaded load support 174 toward the outer end of the means of storage 151 to carry the cassette 190 on it to a predetermined position over the temporary support 153 of the means of storage 151, as shown with two-dot chain lines K in FIG. 13 and solid lines in FIG. 15, and in FIG. 16.

Next, the loaded load support 174 is lowered through the operating space 154 within the temporary support 153 to transfer the cassette 190 onto the temporary support 153 in such a manner that the outer end portions of the cassette slots 191 can engage with the positioning pins 155 on the temporary support 153. In the meantime, the positioning pins 174a on the load support 174 disengage downward from the cassette slots 191. This ends the process, in the present embodiment, for making the cassette 190 stand by temporarily on the means of storage 151.

During the foregoing processes, the bottom slots 7 of each cassette 190 can engage with the positioning pins 35, 82, 106, 115, 142a, 143, 155 or 174a. This prevents the cassette 190 from falling down or shifting out of position with centrifugal force or otherwise while the cassette is turning.

The cassette 190 carried out of the storage chamber 17 by the outlet port 111b or supported on the temporary support 153 of the means of storage 151 can be conveyed to a desired place manually or by the conveyor 181. If the conveyor 181 is used, its carriage 183 is stopped in the lifting position over the outlet port 111b or the means of storage 151. Subsequently, the hanger 185 of the conveyor 181 is lowered, and then its gripper grips the cassette 190 on the temporary support 113 or 153 of the outlet port 111b or the means of storage 151. Thereafter, the hanger 185 is lifted to its top position, and then the load holder 184 of the conveyor 181 holds the gripped cassette 190. Then, the loaded carriage 183 is moved to convey the cassette 190 to the desired place.

Each of the processes for carrying cassettes 191 into and out of the storage chambers 17 may include the step of vertically moving the carrier 81 of the transferrer 51, with a cassette 190 on the carrier 81, through the vertical duct 96 between the two storage apparatuses 10. The carrier 81 can be moved vertically with the lift 60 when the carrier 81 faces toward the rack axes 22 and is retracted into the home position over the turner 70. This step makes it possible to carry a cassette 190, whether from the upper or lower clean room 8, selectively into one of the storage apparatuses 10. The step also makes it possible to carry a cassette 190, whether from the upper or lower storage apparatus 10, selectively into one of the clean rooms 8. The step enables the transferrer 51 to transfer cassettes 190 between the two storage apparatuses 10.

FIG. 17(a) shows load storage equipment according to a second embodiment of the present invention. This storage equipment includes a transferrer 51, an upper load storage apparatus and a lower load storage apparatus. Each storage apparatus includes two rotary racks 21, one (or more) fixed rack 101, an inlet port 111a and an outlet port 111b. Each of the rotary racks 21 has a vertical axis 22 and a cylindrical path 23 coaxial with this axis. The transferrer 51 has a vertical axis 52 and a cylindrical path 53 coaxial with this axis. The three vertical axes 22 and 52 extend on a vertical plane 109. The transferrer 51 is interposed between the two rotary racks 21. The fixed rack 101 is positioned on the cylindrical path 53 of the transferrer 51. The inner end portions of the two ports 111a and 111b are positioned in a lower space formed in one of the two rotary racks 21. The ports 111a and 111b are so oriented that loads can be carried into and out of the storage apparatus in the horizontal directions 145 parallel to the vertical plane 109. Each of the rotary racks 21 has a transfer position P, where loads can be transferred between the rack 21 and the transferrer 51. Each cylindrical path 23 is in contact with the cylindrical path 53 at the associated transfer position P.

FIG. 17(b) shows load storage equipment according to a third embodiment, which is a modification of the second, of the present invention. This storage equipment includes a transferrer 51, an upper load storage apparatus and a lower load storage apparatus. Each storage apparatus includes two rotary racks 21 and two (or more) fixed racks 101. The vertical axis 22 of each rotary rack 21 and the vertical axis 52 of the transferrer 51 extend on a vertical plane 109. The two vertical planes 109 make an angle with each other.

FIG. 17(c) shows load storage equipment according to a fourth embodiment, which is a modification of the second shown in FIG. 17(a), of the present invention. This storage equipment includes a transferrer 51, an upper load storage apparatus and a lower load storage apparatus. Each storage apparatus includes three rotary racks 21 and two (or more) fixed racks 101. The transferrer 51 is interposed between two of the three rotary racks 21, the other of which is positioned on one side of the transferrer 51. The two fixed racks 101 are positioned on the cylindrical path 53 and the other side of the transferrer 51. As is the case with the second embodiment, each of the three rotary racks 21 has a transfer position P, where loads can be transferred between the rack 21 and the transferrer 51.

In the storage equipment according to the second, third or fourth embodiment, the inner end portions of the ports 111a and 111b of each storage apparatus are positioned in the lower space in one the associated rotary racks 21. Because no load is transferred directly between each of these ports 111a and 111b and the transferrer 51 of this equipment, the storage apparatus includes an exclusive transferrer (not shown) for transferring a load between each of the ports 111a and 111b and a turning shelf 32 positioned at the same stage where the ports are. The transferrer 51 can transfer loads via the turning shelves 32 at this stage to and from the ports 111a and 111b.

FIG. 18(a) shows load storage equipment according to a fifth embodiment of the present invention. This storage equipment includes two transferrers 51, an upper load storage apparatus and a lower load storage apparatus. Each storage apparatus includes a rotary rack 21, eight (or some) fixed racks 101, an inlet port 111a and an outlet port 111b. The rotary rack 21 is supported on one side of the position between the transferrers 51. Each of the transferrers 51 has a vertical axis 52 and a cylindrical path 53 coaxial with this axis. Four of the eight fixed racks 101 are positioned on each cylindrical path 53. The inner end portion of each of the two ports 111a and 111b is positioned in a lower space formed in one of the four fixed racks 101 on one of the cylindrical paths 53. The ports 111a and 111b are so oriented that loads can be carried into and out of the storage apparatus in the horizontal directions 145 parallel to the vertical plane on which the transferrer axes 52 extend. The rotary rack 21 has two transfer positions P, in each of which loads can be transferred between the rack 21 and one of the transferrers 51.

FIG. 18(b) shows load storage equipment according to a sixth embodiment of the present invention. This storage equipment includes a first transferrer 51, a second transferrer 51, an upper load storage apparatus and a lower load storage apparatus. Each storage apparatus includes a first rotary rack 21 and a second rotary rack 21. The first rotary rack 21 and the first transferrer 51 are arranged in the same positions as in the first embodiment. The second rotary rack 21 is supported on one side of the first transferrer 51. The second transferrer 51 is positioned on one side of the first rotary rack 21 and adjoins the second rotary rack 21. Each of the transferrers 51 has a vertical axis 52 and a cylindrical path 53 coaxial with this axis. Each storage apparatus also includes six (or some) fixed racks 101, three of which may be positioned on each cylindrical path 53. Each of the two rotary racks 21 has two transfer positions P, in each of which loads can be transferred between the rack 21 and one of the transferrers 51.

In each of the six embodiments, the fixed rack or racks 101 are not essential to the present invention, and may be omitted. If no fixed rack is fitted in the space around the transferrer or each transferrer 51, the carrier 81 of the transferrer 51 would not need to be able to turn on its vertical axis 52, but only need to be able to move vertically and protrude and retract when it faces toward the transfer position P of the rotary rack or one of the rotary racks 21. Of course, if two or more rotary racks 21 are arranged around one transferrer 51, the vertically movable carrier 81 of the transferrer 51 may be able to turn on its vertical axis 52 so as to face toward the transfer position P of any one of the racks 21.

In each of the embodiments, one or more rotary racks 21 are fitted on each of the stories 1 and 2. Rotary racks 21 may be fitted on three or more stories. Rotary racks 21 may be fitted on some of three or more stories. In this case, no rotary rack is fitted in one or more stories interposed between the stories fitted with rotary racks 21. In any case, one or more transferrers 51 extend through the floor between two stories with rotary racks 21 or the floors each between two stories with rotary racks 21. If rotary racks 21 are fitted on four stories, one or more transferrers 51 may be provided for two adjacent stories, and another or other transferrers 51 may be provided for the other adjacent stories.

In each of the embodiments, as is the case with the first embodiment, it is preferable that the vertical axis 22 of the rotary rack or one of the rotary racks 21 on each story be coaxial with that on the other story. However, if the carrier 81 of the transferrer or each transferrer 51 can turn on its vertical axis 52, as is the case with the first embodiment, the upper and lower rack axes 22 may be shifted circumferentially from each other around the axis 52 of the transferrer or one of the transferrers 51.

In each of the embodiments, if one or more fixed racks 101 or one or more rotary racks 21 may be fitted around the transferrer or each transferrer 51 in plan view, the carrier 81 of the transferrer 51 turns about its vertical axis 52. In this case, in the first embodiment, the lift 60 supports the turner 70, which supports the carrier 81 in such a manner that the carrier can protrude and retract. The lift 60 may not turn, but instead the turner 70 can turn on the vertical axis 52. Alternatively, the base frame 54 of the transferrer 51 may be supported rotatably around the vertical axis 52 so that the whole transferrer could turn on this axis.

The carrier 81 of each transferrer 51 is designed to support the bottom of a cassette 190. Alternatively, the carrier 81 may be designed to hold a cassette 190 in such a manner that the cassette could hang from the carrier. Otherwise, each cassette 190 may include one or more parts protruding from sides or the top of it, and the carrier 81 may be designed to engage with the protruding part or parts.

Each of the rotary racks 21 is designed to turn within the angular range of 180 degrees in each direction, and may be designed to turn within an angular range larger than 180 degrees in each direction, or to turn in only one direction.

In each of the embodiments where the ports 111a and 111b are incorporated in fixed racks 101, it is preferable that each of the ports 111a and 111b be positioned at one of the fixed racks 101. If there are three or more fixed racks 101, as is the case with the first embodiment, each of the ports 111a and 111b can be positioned at any one of the fixed racks 101. As the need arises, two or more inlet ports 111a and two or more outlet ports 111b may be provided for one load storage apparatus. Regardless of the number of fixed racks 101, both ports 111a and 111b may be positioned at one of them. The ports 111a and 111b may be replaced by one port. Of course, if an exclusive transferrer is provided, as previously stated, the ports 111a and 111b may be positioned at the rotary rack 21. The ports 111a and 111b may be positioned horizontally away from the rotary and fixed racks 21 and 101 in such a manner that loads could be transferred between each of the ports and the carrier 81 of the transferrer 51.

In the first embodiment, the inlet and outlet ports 111a and 111b are so oriented that they can carry loads in the opposite directions 145. This may require a means for shifting the load in the inner end portion of each of the inlet and outlet ports 111a and 111b between the position facing toward the associated second vertical axis 52 and the position facing in the direction in which the load can be carried into or out of the associated storage chamber 17. Alternatively, the ports 111a and 111b may be positioned radially of the second vertical axis 52. It is preferable that some lower or lowest stages of turning shelves 32 or fixed shelves 103 of the associated rack/s 21 or 101 be replaced with a space, where the inner end portions of the ports 111a and 111b are positioned. Alternatively, some middle or upper stages of turning shelves 32 or fixed shelves 103 may be replaced with a space for the ports 111a and 111b.

The structure of the ports 111a and 111b is not limited to that of the first embodiment. The ports 111a and 111b may be fitted with roller conveyors or vertically movable belt conveyors, or the like.

The storage equipment according to the first embodiment includes a means of storage 151, which is connected to the outlet port 111b, and which may be omitted. Another means of storage may be connected to the inlet port 111a.

In the first embodiment, the housings 11 and the duct 96 isolate the whole storage equipment, which includes the rotary racks 21, the transferrer 51 and fixed racks 101, from the clean rooms 8. Alternatively, the housings 11 and the duct 96 may be omitted, and the storage equipment may be exposed in the clean rooms 8.

The storage equipment according to each of the embodiments can store cassettes 190 in the form of containers, and can store other loads in any form, such as carrying, transporting pallets, or the like.

Having now described one or more exemplary embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

What is claimed is:

1. A load storage system comprising:

at least two rotary racks supported independently on respective stories; the rotary racks each rotatable on a first vertical axis; the rotary racks each including a plurality of load supports arranged circumferentially around the first vertical axis and arranged vertically;

a common transferrer extending vertically through a floor between the stories on which the racks are supported, the transferrer including a carrier vertically movable so as to carry loads to and from the load supports of the racks, said common transferrer further comprising a post, a lift vertically movable along the post, and a turner supported on one side of the post by the lift and rotatable on a second vertical axis; the carrier supported on the turner and horizontally movable in opposite directions between a retracted position on or over the turner and a protruded position;

a rectangular-box shaped housing provided on each of the said at least two stories so as to accommodate the rotary rack at one side within the housing and at least part of the transferrer at the other side; and at least one fixed rack fitted on at least one of the stories and adjacent to one of the rotary racks; the fixed rack and the adjacent rotary rack arranged around the transferrer;

wherein the carrier is rotatable about the second vertical axis so as to rotate between positions, each position being adjacent to one of the fixed rack and the adjacent rotary rack.

2. A load storage system according to claim 1 wherein the first vertical axes of the rotary racks are coaxial with each other.

3. A load storage system according to claim 1 wherein:

the rotary rack on each of the stories includes at least two rotary racks arranged around the transferrer; and the carrier rotatable about the second vertical axis so as to turn between positions; wherein each position is adjacent to one of the rotary racks on each of the stories.

4. A load storage system according to claim 1 further comprising an inlet-outlet port formed on at least one of the stories and adjacent to one of the rotary racks;

the inlet-outlet port and the adjacent rotary rack arranged around the transferrer;

the carrier rotatable about a second vertical axis so as to turn between positions; wherein each position is adjacent to one of the inlet-outlet port and the adjacent rotary rack.

5. A load storage system according to claim 3 further comprising an inlet-outlet port formed on at least one of the stories and adjacent to one of the rotary racks;

the inlet-outlet port and the adjacent rotary rack arranged around the transferrer;

the carrier rotatable about the second vertical axis so as to turn between positions; wherein each position is adjacent to one of the inlet-outlet port and the adjacent rotary rack.

6. A load storage system according to claim 1 wherein:

the carrier is adapted to move vertically through the floor between the stories when the carrier is in the retracted position, with the opposite directions parallel to the plane on which the post and the second vertical axis extend.

7. A load storage system according to claim 3 wherein:

the carrier is adapted to move vertically through the floor between the stories when the carrier is in the retracted position, with the opposite directions parallel to the plane on which the post and the second vertical axis extend.

8. A load storage system according to claim 4 wherein:

the carrier is adapted to move vertically through the floor between the stones when the carrier is in the retracted position, with the opposite directions parallel to the plane on which the post and the second vertical axis extend.

9. A load storage system according to claim 1 wherein a clean room is formed on at least one of the stories and the housing is provided in the clean room and housing in isolation the rotary rack supported on the story, the fixed rack and at least part of the transferrer.

10. A load storage system according to claim 3 wherein a clean room is formed on at least one of the stories, and the housing is provided in the clean room and housing in isolation the rotary rack supported on the story, the fixed rack and at least part of the transferrer.

11. A load storage system according to claim 4 wherein a clean room is formed on at least one of the stories, and the housing is provided in the clean room and housing in isolation the rotary rack supported on the story, the fixed rack and at least part of the transferrer.

12. A load storage system according to claim 1 wherein a clean room is formed on at least one of the stories, and the housing is provided in the clean room and housing in isolation the rotary rack supported on the story, the fixed rack and at least part of the transferrer.

13. A load storage system according to claim 6 wherein a clean room is formed on at least one of the stories, and the housing is provided in the clean room and housing in isolation the rotary rack supported on the story, the fixed rack and at least part of the transferrer.

14. A load storage system according to claim 7 wherein a clean room is formed on at least one of the stories, and the housing is provided in the clean room and housing in isolation the rotary rack supported on the story, the fixed rack and at least part of the transferrer.

15. A load storage system according to claim 8 wherein a clean room is formed on at least one of the stories, and the housing is provided in the clean room and housing in isolation the rotary rack supported on the story, the fixed rack and at least part of the transferrer.

* * * * *